US011869402B2

(12) United States Patent
Gai et al.

(10) Patent No.: US 11,869,402 B2
(45) Date of Patent: Jan. 9, 2024

(54) PIXEL CIRCUIT AND DISPLAY PANEL THEREOF

(71) Applicant: HEFEI VISIONOX TECHNOLOGY CO., LTD., Anhui (CN)

(72) Inventors: Cuili Gai, Hefei (CN); Junfeng Li, Hefei (CN); Ling Wang, Hefei (CN); Enqing Guo, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 0 days.

(21) Appl. No.: 17/990,145

(22) Filed: Nov. 18, 2022

(65) Prior Publication Data

US 2023/0133704 A1 May 4, 2023

Related U.S. Application Data

(63) Continuation of application No. PCT/CN2021/122002, filed on Sep. 30, 2021.

(30) Foreign Application Priority Data

Dec. 30, 2020 (CN) ........................ 202011613482.X

(51) Int. Cl.
*G09G 3/20* (2006.01)

(52) U.S. Cl.
CPC ....... *G09G 3/20* (2013.01); *G09G 2300/0819* (2013.01); *G09G 2300/0852* (2013.01);
(Continued)

(58) Field of Classification Search
CPC ...... G09G 3/3233; G09G 3/3266; G09G 3/32; G09G 3/3225; G09G 3/3291; G09G 3/30;
(Continued)

(56) References Cited

U.S. PATENT DOCUMENTS

2018/0286313 A1* 10/2018 Zheng .................. G09G 3/3258
2018/0342195 A1* 11/2018 Zhou .................... G09G 3/3233
(Continued)

FOREIGN PATENT DOCUMENTS

CN 107452339 A 12/2017
CN 107945743 A 4/2018
(Continued)

OTHER PUBLICATIONS

International Search Report dated Nov. 22, 2021, in corresponding International Application No. PCT/ CN2021/122002, 6 pages.
(Continued)

*Primary Examiner* — Dong Hui Liang
(74) *Attorney, Agent, or Firm* — Maier & Maier, PLLC

(57) ABSTRACT

Provided are a pixel circuit and a display panel thereof. The pixel circuit includes: a drive module, a data write module, an initialization module, a light emission control module and a light emission module, where the initialization module is electrically connected to a control terminal of the drive module and configured to write an initialization voltage to the control terminal of the drive module at an initialization stage, the light emission control module, the drive module and the light emission module are connected in series to form a driving branch, and the light emission control module is configured to be turned on at a light emission stage under a control of a first light emission control signal and under a control of a second light emission control signal so that the driving branch is turned on.

20 Claims, 12 Drawing Sheets

(52) U.S. Cl.
CPC ............... *G09G 2300/0861* (2013.01); *G09G 2310/0286* (2013.01); *G09G 2310/08* (2013.01); *G09G 2320/0233* (2013.01); *G09G 2330/026* (2013.01)

(58) Field of Classification Search
CPC ................... G09G 3/3258; G09G 3/20; G09G 2300/0819; G09G 2300/0852; G09G 2310/0251; G09G 2310/08; G09G 2310/0262; G09G 2320/0233; G09G 2320/043; G09G 2320/045
See application file for complete search history.

(56) References Cited

U.S. PATENT DOCUMENTS

| | | | | |
|---|---|---|---|---|
| 2021/0407386 | A1* | 12/2021 | Li | G09G 3/3291 |
| 2022/0301488 | A1* | 9/2022 | Wang | G09G 3/32 |

FOREIGN PATENT DOCUMENTS

| | | | |
|---|---|---|---|
| CN | 108074529 | A | 5/2018 |
| CN | 109712565 | A | 5/2019 |
| CN | 110751927 | A | 2/2020 |
| CN | 111415612 | A | 7/2020 |
| CN | 111508421 | A | 8/2020 |
| CN | 112735314 | A | 4/2021 |

OTHER PUBLICATIONS

First Office Action dated Dec. 22, 2021, in corresponding Chinese Application No. 202011613482.X, 36 pages.
The Second Office Action dated Aug. 4, 2022, in corresponding Chinese Application No. 202011613482.X, 39 pages.

* cited by examiner

PIXEL CIRCUIT AND DISPLAY PANEL THEREOF

CROSS-REFERENCE TO RELATED APPLICATION

This is a continuation of International Patent Application No. PCT/CN2021/122002, filed on Sep. 30, 2021, which is based on and claims priority to a Chinese Patent Application No. CN202011613482.X, filed on Dec. 30, 2020, disclosures of which are incorporated herein by reference in their entireties.

This application claims priority to a Chinese Patent Application No. CN202011613482.X filed on Dec. 30, 2020, disclosures of which are incorporated herein by reference in their entireties.

TECHNICAL FIELD

Embodiments of the present application relate to the field of display technology, for example, a pixel circuit and a display panel thereof.

BACKGROUND

With the development of display technology, an increasingly high requirement is imposed on the quality of image display.

A display panel in the related art generally includes a plurality of pixel circuits, and a magnitude of a current flowing through a light-emitting device in the pixel circuit affects brightness of the light-emitting device. The display panel in the related art has non-uniform display brightness.

SUMMARY

The following is a summary of the subject matter described herein in detail. This summary is not intended to limit the scope of the claims.

The present application provides a pixel circuit and a display panel thereof, so as to improve brightness uniformity of the display panel.

In a first aspect, embodiments of the present application provide a pixel circuit. The pixel circuit includes a drive module, a data write module, an initialization module, a light emission control module and a light emission module.

The initialization module is electrically connected to a control terminal of the drive module and configured to write an initialization voltage to the control terminal of the drive module at an initialization stage.

The data write module is electrically connected to the control terminal of the drive module and configured to write a data voltage to the control terminal of the drive module at a data write stage. The light emission control module, the drive module and the light emission module are connected in series to form a driving branch, and the light emission control module is configured to be turned on at a light emission stage under a control of a first light emission control signal and under a control of a second light emission control signal so that the driving branch is turned on. The first light emission control signal and the second light emission control signal each include a light emission signal and an extinguishing signal, where the light emission signal of the first light emission control signal and the light emission signal of the second light emission control signal overlap at the light emission stage, the extinguishing signal of the first light emission control signal and the extinguishing signal of the second light emission control signal overlap at the data write stage, the light emission signal of the first light emission control signal and the extinguishing signal of the second light emission control signal overlap at the initialization stage, and a period of the initialization stage within one frame is equal to an overlapping period of the light emission signal of the first light emission control signal and the extinguishing signal of the second light emission control signal before the data write stage.

In a second aspect, embodiments of the present application further provide a display panel including the pixel circuit according to the first aspect. The display panel further includes a light emission control driving circuit, where the light emission control driving circuit includes (n+j) stages of cascaded shift registers and n rows of pixel circuits, where a pixel circuit in an i-th row is electrically connected to a shift register at an (i+j)-th stage and a shift register at an i-th stage, separately, a light emission control signal output from the shift register in the (i+j)-th stage serves as a first light emission control signal of the pixel circuit in the i-th row, and a light emission control signal output from the shift register at the i-th stage serves as a second light emission control signal of the pixel circuit in the i-th row.

In a third aspect, embodiments of the present application further provide a display panel including the pixel circuit according to the first aspect. The display panel includes a first light emission control driving circuit and a second light emission control driving circuit, where the first light emission control driving circuit includes n stages of cascaded first shift registers, and the second light emission control driving circuit includes n stages of cascaded second shift registers, where a pixel circuit in an i-th row is electrically connected to a first shift register at an i-th stage and a second shift register at an i-th stage, separately, a light emission control signal output from the first shift register at the i-th stage serves as a first light emission control signal of the pixel circuit in the i-th row, and a light emission control signal output from the second shift register at the i-th stage serves as a second light emission control signal of the pixel circuit in the i-th row.

The embodiments of the present application provide the pixel circuit and the display panel thereof. The pixel circuit includes the drive module, the data write module, the initialization module and the light emission control module. The initialization module is electrically connected to the control terminal of the drive module and used for writing the initialization voltage to the control terminal of the drive module at the initialization stage. The light emission control module, the drive module and the light emission module are connected in series to form the driving branch, and the light emission control module is used for being turned on at the light emission stage under the control of the first light emission control signal and under the control of the second light emission control signal so that the driving branch is turned on, where the light emission signal of the first light emission control signal and the extinguishing signal of the second light emission control signal overlap at the initialization stage, and the period of the initialization stage within one frame is equal to the overlapping period of the light emission signal of the first light emission control signal and the extinguishing signal of the second light emission control signal before the data write stage.

According to the technical solution of this embodiment, a period of the initialization stage may not be limited by a refresh rate, and when the refresh rate is relatively high, it can still ensure a relatively long total time of the initialization stage, thereby ensuring a sufficient reset of the control terminal of the drive module; and in the display panel including this embodiment, after an end of initialization stages of different pixel circuits, control terminals of drive modules can all be initialized to have the same voltage, which is conducive to improving the brightness uniformity of the display panel.

DETAILED DESCRIPTION

Figure 1:
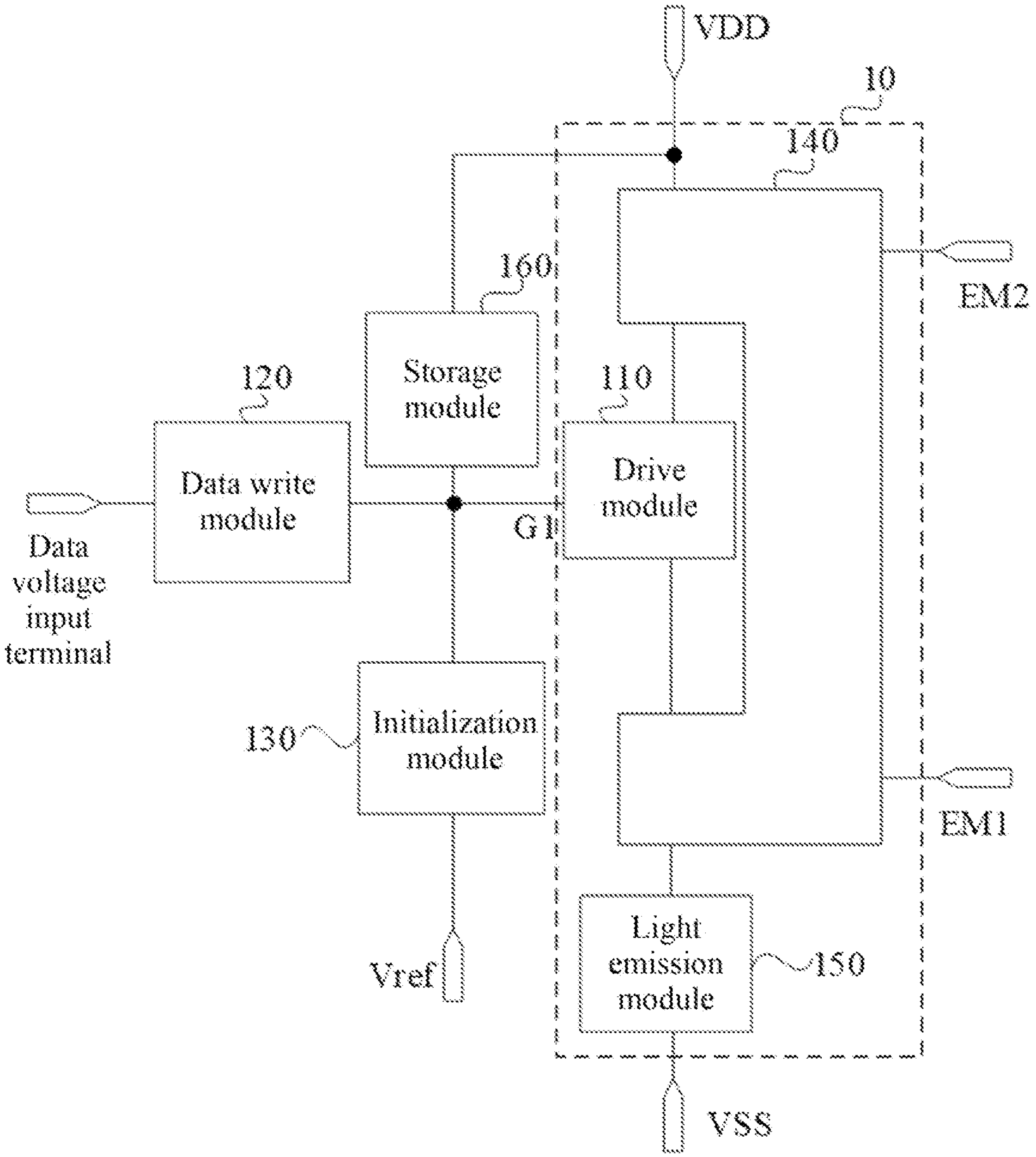
FIG. 1 is a structural diagram of a pixel circuit according to an embodiment of the present application.

The present application is further described in detail in conjunction with the drawings and the embodiments. It is to be understood that the embodiments set forth below are intended to illustrate and not to limit the present application. Additionally, it is to be noted that for ease of description, only part, not all, of structures related to the present application are illustrated in the drawings. As described in BACKGROUND, the display panel in the related art has non-uniform display brightness. Through researches, the applicant finds that a reason for the above situation is that a pixel circuit of the display panel in the related art generally includes a drive transistor and an initialization module configured to initialize a gate potential of the drive transistor, where the initialization module can write an initialization voltage to a gate of the drive transistor when the initialization module is turned on, thereby initializing the gate potential of the drive transistor. The on-state of the initialization module in the related art is generally controlled by a scan signal. With an increase of a refresh rate, a pulse width of the scan signal becomes smaller and smaller. Accordingly, an on-time of the initialization module becomes shorter and shorter, that is, a period for initializing the gate potential of the drive transistor becomes shorter and shorter, resulting in insufficient initialization of the gate of the drive transistor. For example, for two different pixel circuits, corresponding display grayscales in a previous frame are different, that is, data voltages which are written to gates of drive transistors in the previous frame are inconsistent. When gate potentials of the drive transistors are initialized in a current frame, the gates of the drive transistors in the two pixel circuits cannot be initialized to have the same voltage due to a relatively short initialization time. If the two pixel circuits correspond to the same data voltage in the current frame, the same voltage cannot be written to the gates of the drive transistors so that magnitudes of drive currents are inconsistent and brightness of light-emitting devices in the two pixel circuits are different, finally resulting the non-uniform display of the display panel.

Based on the above reasons, the embodiments of the present application provide a pixel circuit. FIG. 1 is a structural diagram of a pixel circuit according to an embodiment of the present application. Referring to FIG. 1, the pixel circuit includes a drive module 110, a data write module 120, an initialization module 130 and a light emission control module 140.

The initialization module 130 is electrically connected to a control terminal G1 of the drive module 110 and configured to write an initialization voltage to the control terminal G1 of the drive module 110 at an initialization stage.

The data write module 120 is electrically connected to the control terminal of the drive module and configured to write a data voltage to the control terminal of the drive module 110 at a data write stage.

The light emission control module 140, the drive module 110 and a light emission module 150 are connected in series to form a driving branch 10, and the light emission control module 140 is configured to be turned on at a light emission stage under a control of a first light emission control signal EM1 and under a control of a second light emission control signal EM2 so that the driving branch 10 is turned on.

Each of the first light emission control signal EM1 and the second light emission control signal EM2 includes a light emission signal and an extinguishing signal, where the light emission signal of the first light emission control signal EM1 and the light emission signal of the second light emission control signal EM2 overlap at the light emission stage, the extinguishing signal of the first light emission control signal EM1 and the extinguishing signal of the second light emission control signal EM2 overlap at the data write stage, the light emission signal of the first light emission control signal EM1 and the extinguishing signal of the second light emission control signal EM2 overlap at the initialization stage, and a period of the initialization stage within one frame is equal to an overlapping period of the light emission signal of the first light emission control signal EM1 and the extinguishing signal of the second light emission control signal EM2 before the data write stage.

For example, an operating process of the pixel circuit may include the initialization stage, the data write stage after the initialization stage and the light emission stage after the data write stage. At the initialization stage, the initialization module 130 is turned on, and the initialization voltage input from an initialization voltage terminal Vref is transmitted to the control terminal of the drive module 110. At the data write stage, the data write module 120 is turned on, and the data voltage input from a data voltage input terminal Data is transmitted to the control terminal of the drive module 110. At the light emission stage, the light emission control module 140 is turned on, the driving branch 10 is turned on, and the drive module 110 drives the light emission module 150 to emit light.

The on-state of the data write module 120 is at least controlled by a scan signal. When the data write module 120 is controlled by only one scan signal which is an effective level signal, the data write module 120 is turned on, and the data voltage is transmitted to a gate of a drive transistor. A period of the initialization stage is equal to an on-time of the initialization module 130 within one frame. In this embodiment, the on-state of the initialization module 130 may be jointly controlled by the first light emission control signal EM1 and the second light emission control signal EM2, and the on-state of the light emission control module 140 may also be jointly controlled by the first light emission control signal EM1 and the second light emission control signal EM2. In this embodiment, the first light emission control signal EM1 and the second light emission control signal EM2 each include the light emission signal and the extinguishing signal, where the light emission signal and the extinguishing signal may be opposite level signals, for example, when the light emission signal is a logic low-level signal, the extinguishing signal is a logic high-level signal; when the light emission signal is a logic high-level signal, the extinguishing signal is a logic low-level signal. When the first light emission control signal EM1 is a light emission signal and the second light emission control signal EM2 is an extinguishing signal, the initialization module 130 is turned on, and the initialization voltage is transmitted to the control terminal G1 of the drive module. When both the first light emission control signal EM1 and the second light emission control signal EM2 are extinguishing signals, the data write module 120 may be turned on at least under a control of the scan signal, and the data voltage is transmitted to the control terminal G1 of the drive module. When both the first light emission control signal EM1 and the second light emission control signal EM2 are light emission control signals, the light emission control module 140 is turned on, and after the data voltage is written and the light emission control module 140 is turned on, the drive module is turned on so that the driving branch 10 is connected and the drive module 110 drives the light emission module 150 to emit light.

In this embodiment, the period of the initialization stage within one frame is equal to the overlapping period of the light emission signal of the first light emission control signal EM1 and the extinguishing signal of the second light emission control signal EM2 before the data write stage. The pixel circuit of this embodiment may be applied to a display panel, where the display panel may include at least one light emission control driving circuit, where the at least one light emission driving circuit includes multiple stages of cascaded shift registers, where the first light emission control signal EM1 and the second light emission control signal EM2 are light emission control signals output from shift registers at different stages in one light emission control driving circuit, and the second light emission control signal EM2 is output from at least one stage of shift register before a shift register which outputs the first light emission control signal EM1. The first light emission control signal EM1 and the second light emission control signal EM2 may also be light emission control signals output from shift registers in two light emission control driving circuits. For example, the first light emission control signal EM1 is output from a shift register in a first light emission control circuit, and the second light emission control signal EM2 is output from a shift register in a second light emission control driving circuit. For either of the first light emission control circuit and the second light emission control circuit, a process of outputting a light emission control signal from a shift register in each stage in the light emission control circuit is substantially a shifting process of a start signal input to the light emission control circuit. Therefore, through an adjustment of the start signal to the first light emission control circuit and the start signal to the second light emission control driving circuit, an overlapping period of a light emission signal of the first light emission control signal EM1 output from the first light emission control circuit and an extinguishing signal of the second light emission control signal EM2 output from the second light emission control driving circuit can be adjusted.

Compared with the scheme in the related art where the period of the initialization stage is equal to the period corresponding to the pulse width of the scan signal, in this embodiment, the period of the initialization stage may not be limited by a refresh rate, and when the refresh rate is relatively high, it can still ensure a relatively long total period of the initialization stage, thereby ensuring a sufficient reset of the control terminal G1 of the drive module 110 (that is, the initialization voltage is sufficiently written to the control terminal G1 of the drive module 110); and in the display panel including this embodiment, after an end of initialization stages of different pixel circuits, control terminals of drive modules 110 can all be initialized to have the same voltage (the initialization voltage), and when the different pixel circuits correspond to the same data voltage during subsequent data writing, the same voltage can be written to the control terminals G1 of the drive modules 110 of the different pixel circuits so that magnitudes of drive currents in the different pixel circuits are consistent and brightness of different light emission modules 150 is relatively consistent, thereby improving brightness uniformity of the display panel.

Since in the pixel circuit in the related art, the period of the initialization stage is equal to the pulse width of the scan signal, in this embodiment, before the data write stage, the overlapping period of the light emission signal of the first light emission control signal EM1 and the extinguishing signal of the second light emission control signal EM2 is greater than the period corresponding to the pulse width of the scan signal so that compared with the related art, the period of the initialization stage is prolonged, thereby ensuring that the initialization voltage can be sufficiently written to the control terminal G1 of the drive module 110.

The pixel circuit provided in this embodiment includes the drive module, the data write module, the initialization module and the light emission control module. The initialization module is electrically connected to the control terminal of the drive module and configured to write the initialization voltage to the control terminal of the drive module at the initialization stage. The light emission control module, the drive module and the light emission module are connected in series to form the driving branch, and the light emission control module is configured to be turned on at the light emission stage under the control of the first light emission control signal and under the control of the second light emission control signal so that the driving branch is turned on, where the light emission signal of the first light emission control signal and the extinguishing signal of the second light emission control signal overlap at the initialization stage, and the period of the initialization stage within one frame is equal to the overlapping period of the light emission signal of the first light emission control signal and the extinguishing signal of the second light emission control signal before the data write stage. According to the technical solution of this embodiment, the period of the initialization stage may not be limited by the refresh rate, and when the refresh rate is relatively high, it can still ensure a relatively long total period of the initialization stage, thereby ensuring a sufficient reset of the control terminal of the drive module; and in the display panel including this embodiment, after the end of initialization stages of different pixel circuits, control terminals of drive modules can all be initialized to have the same voltage, which is conducive to improving the brightness uniformity of the display panel.

Figure 2:
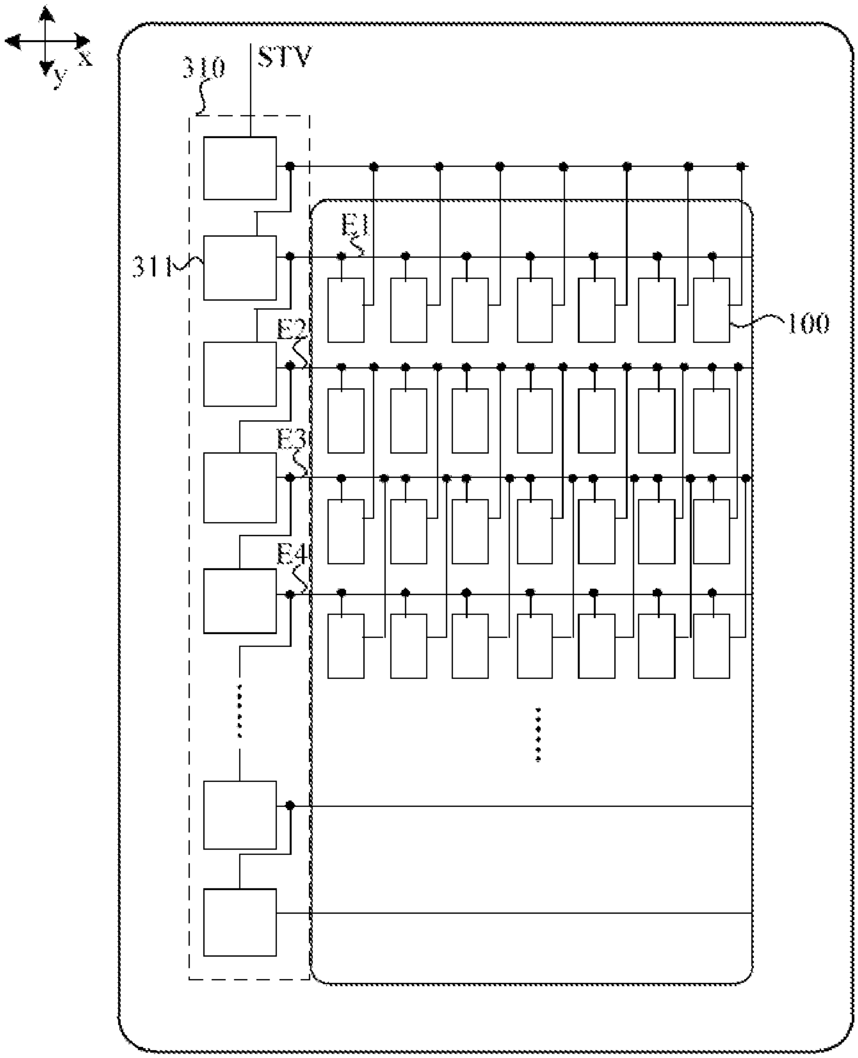
FIG. 2 is a structural diagram of a display panel according to an embodiment of the present application.

FIG. 2 is a structural diagram of a display panel according to an embodiment of the present application. Referring to FIGS. 1 and 2, on the basis of the above technical solution, the pixel circuit is applied to a display panel, and the display panel includes a light emission control driving circuit 310, where the light emission control driving circuit 310 includes (n+j) stages of shift registers 311 disposed in a cascade manner and n rows of pixel circuits 100, n≥2 and j≥1. For a light emission control module 140 in any one of the pixel circuits, the light emission control module 140 is configured to be turned on at the light emission stage under a control of a light emission control signal at a current stage corresponding to a row where a pixel circuit to which the light emission control module belongs is located and under a control of a light emission control signal at a j-th stage preceding the light emission control signal at the current stage so that the driving branch is turned on.

The light emission control signal at the current stage is a light emission control signal output from a shift register at an (i+j)-th stage corresponding to the pixel circuit which is located in an i-th row of the display panel, where the light emission control signal at the current stage serves as the first light emission control signal EM1, the first j stages of light emission control signals of the light emission control signal at the current stage serve as the second light emission control signal EM2, and i≥1, where a period of the initialization stage is a difference between starting points of same level pulses of the light emission control signal at the current stage and the light emission control signal at the j-th stage preceding the light emission control signal at the current stage.

Referring to FIG. 2, the case of j=1 is exemplarily shown in FIG. 2. The display panel may include the n rows of pixel circuits 100 of this embodiment arranged in an array. The light emission control driving circuit 310 includes (n+j) stages of cascaded shift registers, where a shift register corresponding to the pixel circuit in the i-th (1≤i≤n) row is the shift register at the (i+j)-th stage, accordingly, the light emission control signal at the current stage (the first light emission control signal EM1) corresponding to the pixel circuit in the i-th row is a light emission control signal at an (i+j)-th stage, and the first j stages of light emission control signals of the light emission control signal at the current stage corresponding to the pixel circuit in the i-th row, that is, a light emission control signal output from a shift register at an i-th stage is a second light emission control signal EM2 corresponding to the pixel circuit in the i-th row. For any pixel circuit, the light emission control signal at the current stage is the light emission control signal corresponding to the pixel circuit row where the pixel circuit is located in the display panel. For example, for the pixel circuit located in the i-th row, the light emission control signal at the current stage is the light emission control signal at the (i+j)-th stage. In this embodiment, first j stages of shift registers (a shift register in a first stage to a shift register in a j-th stage) of the light emission control circuit may be dummy shift registers, where the dummy shift registers do not correspond to pixel circuit rows but generate second light emission control signals corresponding to the first j rows of pixel circuits, for example, for a pixel circuit in a first row, a first light emission control signal is a light emission control signal output from a shift register at a (1+j)-th stage, and a second light emission control signal is a light emission control signal output from a shift register at a (1+j-j)-th stage, that is, a light emission control signal output from the shift register at the first stage.

In this embodiment, the period of the initialization stage is the difference between the starting points of the same level pulses of the light emission control signal at the current stage (the first light emission control signal EM1) and the light emission control signal at the j-th stage (the second light emission control signal EM2) preceding the light emission control signal at the current stage.

Figure 3:
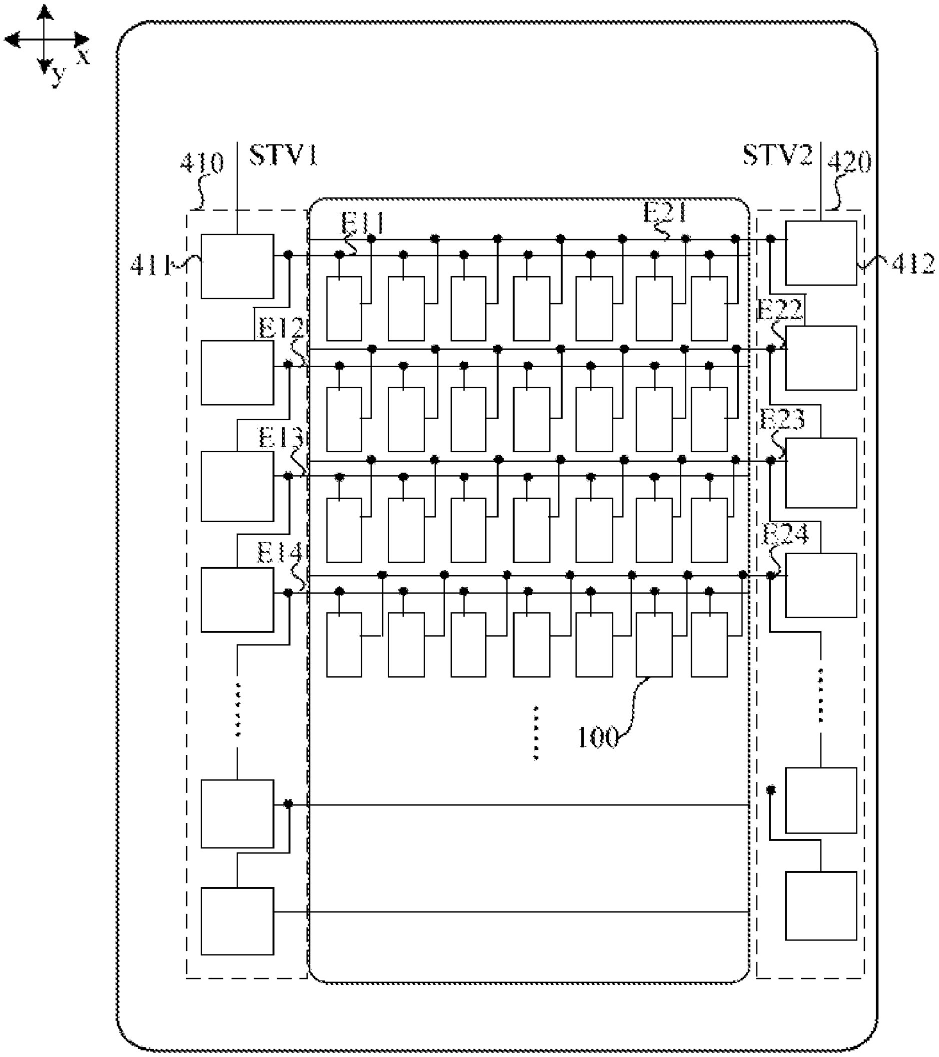
FIG. 3 is a structural diagram of another display panel according to an embodiment of the present application.

For example, the difference between the starting points of the same level pulses of the light emission control signal EM1 in the current stage and the first j stages of light emission control signals of the light emission control signal at the current stage signal at the j-th stage (the second light emission control signal EM2) preceding the light emission control signal at the current stage is greater than the time corresponding to the pulse width of the scan signal so that compared with the related art, the period of the initialization stage is prolonged, thereby ensuring that the initialization voltage can be sufficiently written to the control terminal G1 of the drive module 110. FIG. 3 is a structural diagram of another display panel according to an embodiment of the present application. Referring to FIGS. 1 and 3, the pixel circuit is applied to a display panel, and the display panel includes a first light emission control driving circuit 410 and a second light emission control driving circuit 420, where the first light emission control driving circuit 410 includes n stages of cascaded first shift registers 411, the second light emission control driving circuit 420 includes n stages of cascaded second shift registers 421, and the display panel further includes n rows of pixel circuits 100.

For a light emission control module 140 in any one of the pixel circuits, the light emission control module 140 is configured to be turned on at the light emission stage under a control of a first light emission control signal EM1 corresponding to an i-th row where a pixel circuit 100 to which the light emission control module 140 belongs is located and under a control of a second light emission control signal EM2 corresponding to the i-th row where the pixel circuit 100 to which the light emission control module 140 belongs is located so that the driving branch 10 is turned on.

The first light emission control signal EM1 corresponding to the i-th row where the pixel circuit is located is a light emission control signal output from a first shift register at an i-th stage in the first light emission control driving circuit 410, and the second light emission control signal EM2 corresponding to the i-th row where the pixel circuit is located is a light emission control signal output from a second shift register at an i-th stage in the second light emission control driving circuit 420, where a starting point of a first extinguishing signal of the first light emission control signal EM1 within one frame is earlier than a starting point of an extinguishing signal of the second light emission control signal EM2, and the period of the initialization stage within one frame is equal to a period difference between the starting point of the first extinguishing signal of the first light emission control signal EM1 and the starting point of the extinguishing signal of the second light emission control signal EM2.

Different from the structure of the display panel shown in FIG. 2, the display panel shown in FIG. 3 may include two light emission control driving circuits denoted as the first light emission control driving circuit 410 and the second light emission control driving circuit 420, where the first light emission control driving circuit 410 is configured to generate the first light emission control signal EM1 for driving the pixel circuit, and the second light emission control driving circuit 420 is configured to generate the second light emission control signal EM2 for driving the pixel circuit. When the display panel includes two light emission control driving circuits (the first light emission control driving circuit 410 and the second light emission control driving circuit 420), no dummy shift register may be configured in the first light emission control driving circuit 410 and the second light emission control driving circuit 420. The number of stages of the first shift register 411 included in the first light emission control driving circuit 410 is equal to the number of rows of the pixel circuits, and the number of stages of the second shift register 421 included in the second light emission control driving circuit 420 is equal to the number of rows of the pixel circuit. In other embodiments of the present application, a dummy shift register may be disposed in the first light emission control driving circuit 410 and the second light emission control driving circuit 420, but the dummy shift register is not connected to the pixel circuit, which is not specifically limited in this embodiment.

That no dummy first shift register 411 is configured in the first light emission control driving circuit 410 and no dummy second shift register 421 is configured in the second light emission control driving circuit 420 is used as an example shown in FIG. 3. In this case, the first light emission control signal EM1 corresponding to the i-th row where the pixel circuit 100 is located is the light emission control signal output from the first shift register 411 at the i-th stage in the first light emission control driving circuit 410, and the second light emission control signal EM2 corresponding to the i-th row where the pixel circuit 100 is located is the light emission control signal output from the second shift register 421 at the i-th stage in the second light emission control driving circuit 420, where the starting point of the first extinguishing signal of the first light emission control signal EM1 within one frame is earlier than the starting point of the extinguishing signal of the second light emission control signal EM2, and the period of the initialization stage within one frame is equal to the time difference between the starting point of the first extinguishing signal of the first light emission control signal EM1 and the starting point of the extinguishing signal of the second light emission control signal EM2.

The time difference between the starting point of the first extinguishing signal of the first light emission control signal EM1 and the starting point of the extinguishing signal of the second light emission control signal EM2 is greater than the period corresponding to the pulse width of the scan signal so that compared with the related art, the overlapping period (the period of the initialization stage) of the light emission signal of the first light emission control signal EM1 and the extinguishing signal of the second light emission control signal EM2 before the data write stage is prolonged, thereby ensuring that the initialization voltage can be sufficiently written to the control terminal of the drive module 110.

On the basis of the above technical solution, the extinguishing signal of the first light emission control signal EM1 and the extinguishing signal of the second light emission control signal EM2 have the same pulse width.

Figure 4:
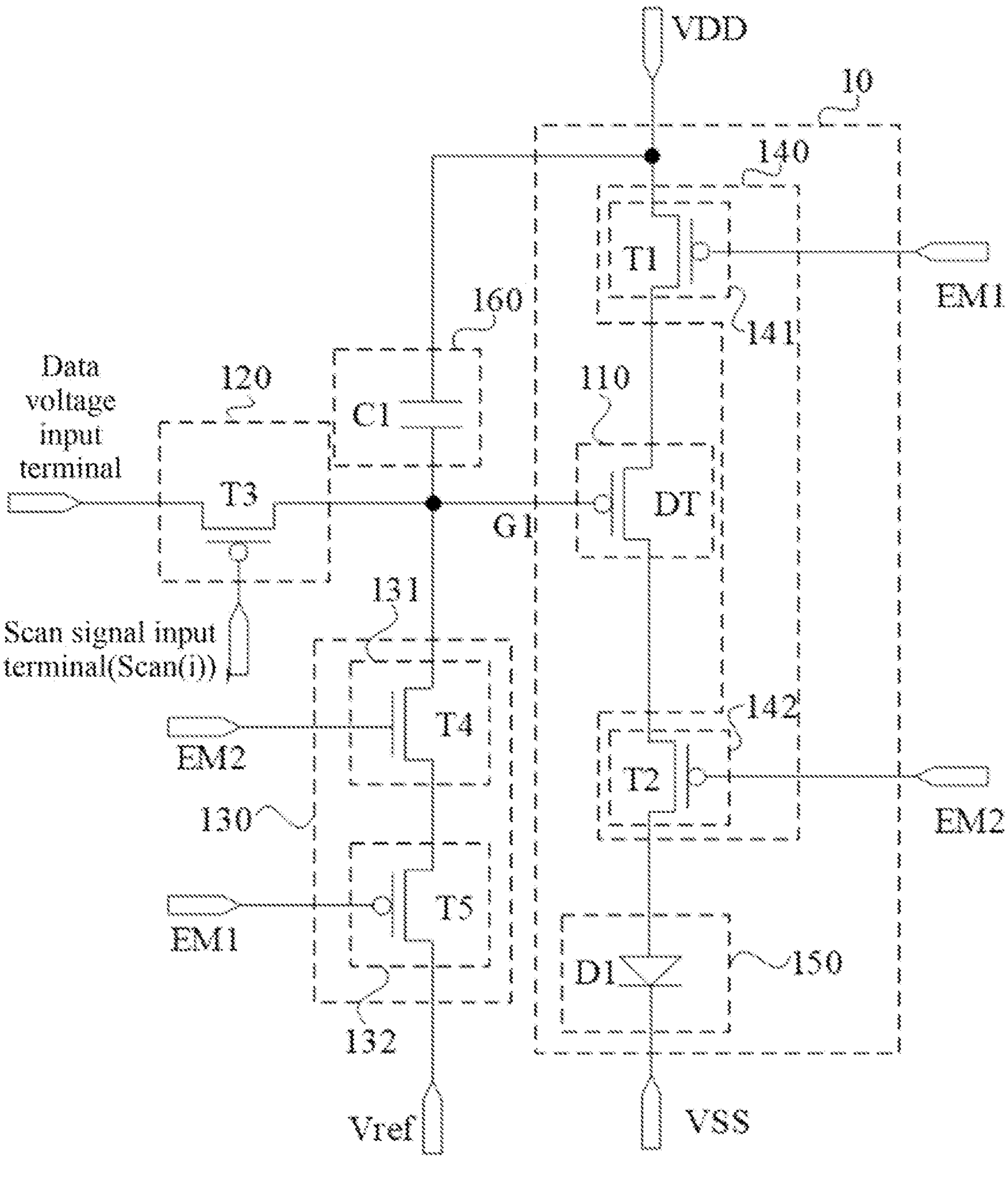
FIG. 4 is a structural diagram of another pixel circuit according to an embodiment of the present application.

FIG. 4 is a structural diagram of another pixel circuit according to an embodiment of the present application. Referring to FIG. 4, the light emission control module 140 includes a first light emission control unit 141 and a second light emission control unit 142, where the first light emission control unit 141 is connected between a first power supply voltage input terminal VDD and a first terminal of the drive module 110, the second light emission control unit 142 is connected between a second terminal of the drive module 110 and a first terminal of the light emission module 150, a control terminal of one of the first light emission control unit 141 and the second light emission control unit accesses the second light emission control signal EM2, and a control terminal of the other one of the first light emission control unit 141 and the second light emission control unit accesses the first light emission control signal EM1.

The first terminal of the light emission module 150 is electrically connected to a second power supply voltage input terminal VS S.

Referring to FIG. 4, the drive module 110 may include a drive transistor DT, and the first light emission control unit 141 may include a first transistor T1, where a gate of the first transistor T1 is the control terminal of the first light emission control unit 141, a first electrode of the first transistor T1 is electrically connected to the first power supply voltage input terminal VDD, and a second electrode of the first transistor T1 is electrically connected to a first electrode of the drive transistor DT. The second light emission control unit 142 includes a second transistor T2, where a gate of the second transistor T2 serves as the control terminal of the second light emission control unit 142, a first electrode of the second transistor T2 is electrically connected to a second electrode of the drive transistor DT, and a second electrode of the second transistor T2 is electrically connected to the first terminal of the light emission module 150. When both the second light emission control signal EM2 and the first light emission control signal EM1 are effective level signals (light emission signals), the light emission control module 140 is turned on. The data write module 120 may include a third transistor T3.

Still referring to FIGS. 1 and 4, the pixel circuit further includes a first storage module 160, where a first terminal of the first storage module 160 is electrically connected to the control terminal G1 of the drive module 110, and a second terminal of the first storage module 160 is electrically connected to the first power supply voltage input terminal VDD. The first storage module 160 is configured to store and hold a potential of the control terminal of the drive module 110. Referring to FIG. 4, the first storage module 160 includes a first capacitor C1.

Still referring to FIG. 4, the initialization module 130 includes at least a first initialization unit 131 and a second initialization unit 132 connected in series to an initialization voltage terminal Vref and the control terminal G1 of the drive module 110, where the first initialization unit 131 is configured to be turned on when a light emission control unit accessing the second light emission control signal EM2 is turned off, and the second initialization unit 132 is configured to be turned on when a light emission control unit accessing the first light emission control signal EM1 is turned on. The first initialization unit 131 may include a fourth transistor T4, and the second initialization unit 132 may include a fifth transistor T5.

The above light emission control unit is the first light emission control unit 141 or the second light emission control unit 142.

On the basis of the above technical solution, the control terminal of the first light emission control unit 141 and a control terminal of the second initialization unit 132 access the first light emission control signal EM1, and the control terminal of the second light emission control unit 142 and a control terminal of the first initialization unit 131 access the second light emission control signal EM2.

A first terminal of the data write module 120 is electrically connected to the data voltage input terminal Data, a second terminal of the data write module 120 is electrically connected to the control terminal G1 of the drive module 110, and a control terminal of the data write module 120 is electrically connected to a scan signal input terminal Scan(i), where the scan signal input terminal Scan(i) may represent a scan signal input terminal located in a pixel circuit in an i-th row of the display panel.

The control terminal of the first light emission control unit 141 accesses the first light emission control signal EM1, and accordingly, the second initialization unit 132 is turned on when the first light emission control unit 141 is turned on. The first light emission control unit 141 and the second initialization unit 132 include transistors of the same type, for example, the first light emission control unit 141 includes a p-type transistor, and the second initialization unit 132 also includes a p-type transistor. Gates of the transistors of the same type included in the first light emission control unit 141 and the second initialization unit 132 each access the first light emission control signal EM1 so that the on-off state of the first light emission control unit 141 is opposite to the on-off state of the second initialization unit 132.

The control terminal of the second light emission control unit 142 accesses the second light emission control signal EM2, and accordingly, the first initialization unit 131 is turned on when the second light emission control unit 142 is turned off. The second light emission control unit 142 and the first initialization unit 131 include transistors of different types, for example, the second light emission control unit 142 includes a p-type transistor, and the first initialization unit 131 includes an n-type transistor. Gates of the transistors of different types included in the second light emission control unit 142 and the first initialization unit 131 each access the second light emission control signal EM2 so that the on-off state of the second light emission control unit 142 is opposite to the on-off state of the first initialization unit 131.

Figure 5:
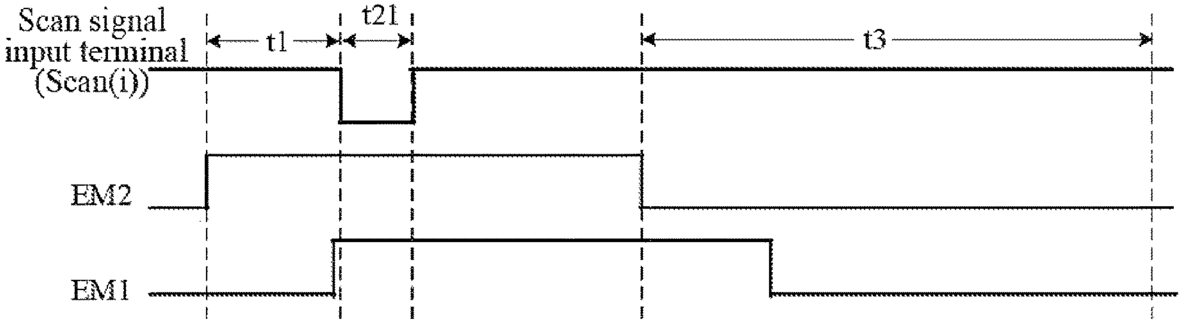
FIG. 5 is a driving timing graph of a pixel circuit according to an embodiment of the present application.

The scan signal input terminal Scan(i) electrically connected to the control terminal of the data write module 120 is accessible to the scan signal at the current stage, and the scan signal is output from the shift register of the scan driving circuit of the display panel. When the display panel includes only one light emission control driving circuit as shown in FIG. 2, for the same pixel circuit, the number of stages of the shift register outputting the scan signal at the current stage may differ by j stages from the number of stages of the shift register of the light emission control driving circuit outputting the first light emission control signal EM1, for example, the light emission control signal at the current stage (the first light emission control signal EM1) corresponding to the pixel circuit in the i-th row of the display panel is the light emission control signal output from the shift register at the (i+j)-th stage. The scan signal at the current stage corresponding to the pixel circuit in the i-th row is the scan signal output from the shift register at the i-th stage of the scan driving circuit. When the display panel includes a first light emission control driving circuit and a second light emission control driving circuit as shown in FIG. 3, for the pixel circuit located in the i-th row, the scan signal input terminal Scan(i) is connected to the shift register at the i-th stage of the scan driving circuit. The first light emission control signal EM1 is the light emission control signal output from the first shift register at the i-th stage of the first light emission control driving circuit, and the second light emission control signal EM2 is the light emission control signal output from the second shift register at the i-th stage of the first light emission control driving circuit. FIG. 5 is a driving timing graph of a pixel circuit according to an embodiment of the present application, and the drive timing may be used for driving the pixel circuit shown in FIG. 4. Each transistor in FIG. 4 may be a p-type transistor or an n-type transistor, and a channel type of the fourth transistor T4 is opposite to that of the second transistor T2. That the fourth transistor T4 is an n-type transistor and the other transistors are p-type transistors is used as an example for a description, for the first light emission control signal EM1 and the second light emission control signal EM2, the light emission signal is a logic low-level signal, and the extinguishing signal is a logic high-level signal. Referring to FIGS. 4 and 5, a working process of the pixel circuit shown in FIG. 4 may include an initialization stage t1, a data write stage t21 and a light emission stage t3.

At the initialization stage t1, the second light emission control signal EM2 is at a logic high level, the fourth transistor T4 is turned on, and the second transistor T2 is turned off; the first light emission control signal EM1 is at a logic low level, the fifth transistor T5 is turned on, and the first transistor T1 is turned on. The initialization module 130 is turned on, and the initialization voltage is written to a gate of the drive transistor DT through the initialization module 130. Moreover, when the pixel circuit is applied to the display panel shown in FIG. 2, a total time of the initialization stage t1 is an overlapping period of the light emission signal of the first light emission control signal EM1 and the extinguishing signal of the second light emission control signal EM2 before the data write stage t21, for example, the total period of the initialization stage t1 is a period difference between a starting point of a first high-level pulse of the first light emission control signal EM1 and a starting point of a first high-level pulse of the second light emission control signal EM2.

Moreover, since at the initialization stage t1, the second transistor T2 is turned off, the light emission module 150 does not emit light by mistake, thereby ensuring a good display effect. According to the technical solution of this embodiment, the period of the initialization stage t1 may not be limited by the refresh rate, and when the refresh rate is relatively high, it can still ensure a relatively long total time of the initialization stage t1, thereby ensuring a sufficient reset of the control terminal of the drive module 110.

At the data write stage t21, the scan signal input terminal Scan(i) inputs a logic low-level signal, the third transistor T3 is turned on, and the data voltage input from the data voltage input terminal Data is transmitted to the gate of the drive transistor DT through the third transistor T3.

At the light emission stage t3, both the second light emission control signal EM2 and the first light emission control signal EM1 are at logic low level, both the first transistor T1 and the second transistor T2 are turned on, the entire driving branch 10 is turned on, and the drive transistor DT drives the light emission module 150 to emit light.

Figure 6:
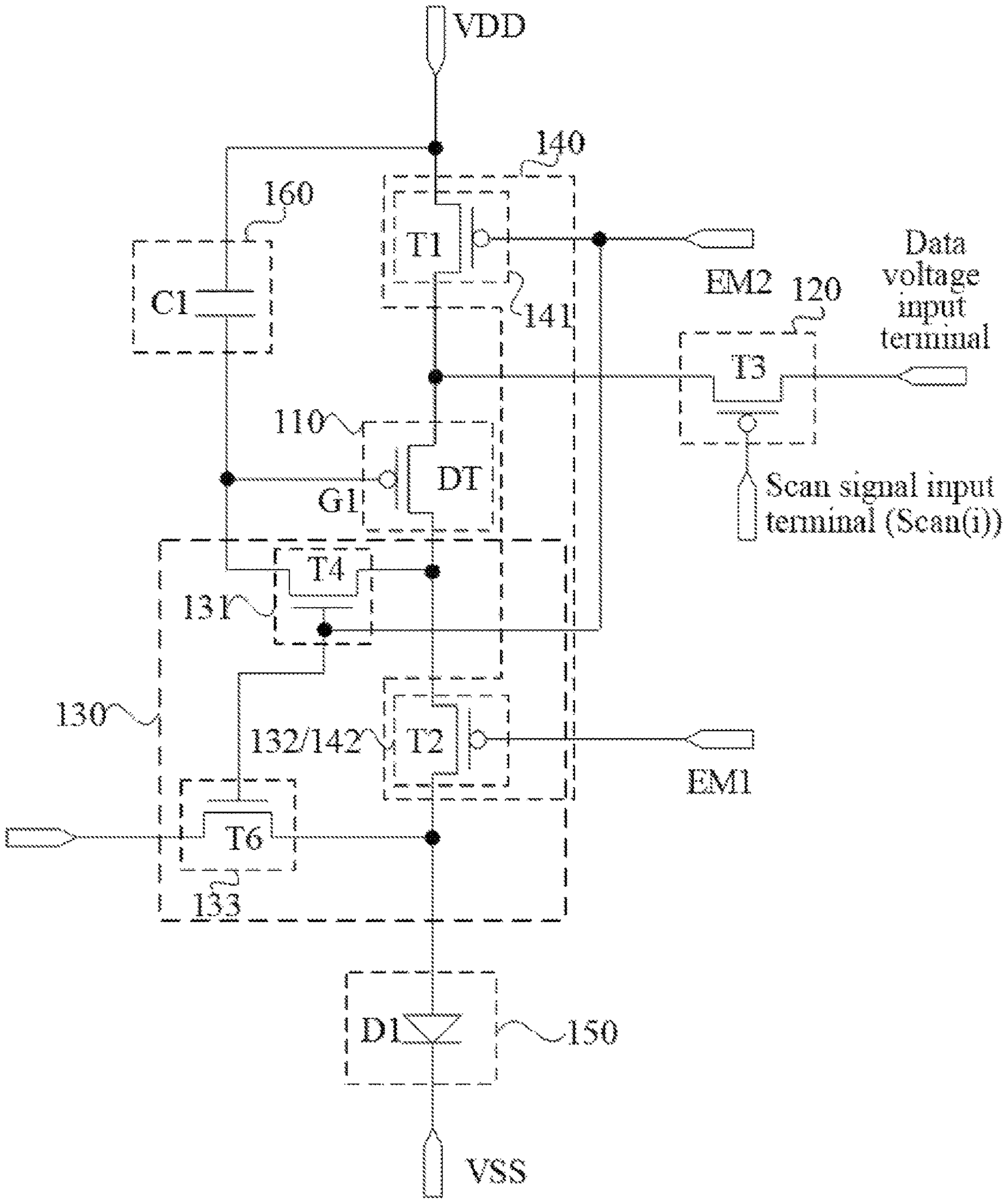
FIG. 6 is a structural diagram of another pixel circuit according to an embodiment of the present application.

In this embodiment and the embodiments below, the light emission module 150 may include a light-emitting device D1, where the light-emitting device D1 may be an organic light-emitting device or an inorganic light-emitting device, which is not specifically limited in this embodiment. FIG. 6 is a structural diagram of another pixel circuit according to an embodiment of the present application. Referring to FIG. 6, the control terminal of the first light emission control unit 141 accesses the second light emission control signal EM2, and the control terminal of the second light emission control unit 142 accesses the first light emission control signal EM1. The first terminal of the data write module 120 is electrically connected to the data voltage input terminal Data, the second terminal of the data write module 120 is electrically connected to the first terminal of the drive module 110, and the control terminal of the data write module 120 is electrically connected to the scan signal input terminal Scan(i). The drive module 110 includes a drive transistor DT, the first initialization unit 131 is connected between the second terminal of the drive module 110 and the control terminal G1 of the drive module 110, and the control terminal of the first initialization unit 131 accesses the second light emission control signal EM2. The first initialization unit 131 is configured to be turned on at the data write stage t21 under the control of the second light emission control signal EM2 and write a signal containing threshold voltage information of the drive transistor DT to the gate of the drive transistor DT, and the second light emission control unit 142 serves as the second initialization unit 132. The initialization module 130 further includes a third initialization unit 133, a first terminal of the third initialization unit 133 is electrically connected to the initialization voltage terminal Vref, a second terminal of the third initialization unit 133 is electrically connected to the first terminal of the light emission module 150, and a control terminal of the third initialization unit 133 accesses the second light emission control signal EM2.

Referring to FIG. 6, the data write module 120 includes a third transistor T3, where a gate of the third transistor T3 serves as a gate of the data write module 120, a first electrode of the third transistor T3 serves as the first terminal of the data write module 120, and a second electrode of the third transistor T3 serves as the second terminal of the data write module 120.

The initialization module 130 includes a first initialization unit 131, a second initialization unit 132 and a third initialization unit 133, where the first initialization unit 131 includes a fourth transistor T4, where the fourth transistor may also serve as a threshold voltage compensation transistor of the pixel circuit for writing the signal including the threshold voltage information of the drive transistor DT to the gate of the drive transistor DT at the data write stage t21. As the second initialization unit 132, the second light emission control unit 142 includes a second transistor T2. The third initialization unit 133 includes a sixth transistor T6, where a gate of the sixth transistor T6 serves as the control terminal of the third initialization unit 133, and the third transistor T3 is connected between the initialization voltage terminal Vref and first terminals of a plurality of light emission modules 150.

The driving timing in FIG. 5 may also be used for driving the pixel circuit shown in FIG. 6. Each transistor in FIG. 6 may be a p-type transistor or an n-type transistor, a channel type of the fourth transistor T4 is opposite to that of the first transistor T1, and a channel type of the sixth transistor T6 is opposite to that of the first transistor T1. That the fourth transistor T4 and the sixth transistor T6 are n-type transistors and the other transistors are p-type transistors is used as an example for a description, for the first light emission control signal EM1 and the second light emission control signal EM2, the light emission signal is a logic low-level signal, and the extinguishing signal is a logic high-level signal. The fourth transistor T4 included in the first initialization unit 131 and the sixth transistor T6 included in the third initialization unit 133 are oxide transistors, for example, indium gallium zinc oxide transistors, thereby reducing leakage current. Referring to FIGS. 5 and 6, a working process of the pixel circuit includes an initialization stage t1, a data write stage t21 and a light emission stage t3.

At the initialization stage t1, the second light emission control signal EM2 is at a logic high level, the first initialization unit 131 (the fourth transistor T4) and the third initialization unit 133 (the sixth transistor T6) are turned on, and the first transistor T1 is turned off; the first light emission control signal EM1 is at a logic low level, and the second initialization unit 132 (the second transistor T2) is turned on. Therefore, the initialization module 130 is turned on, and the initialization voltage is written to the gate of the drive transistor DT through the initialization module 130 (the third initialization unit 133, the second initialization unit 132 and the first initialization unit 131). Moreover, a total period of the initialization stage t1 is an overlapping period of the light emission signal of the first light emission control signal EM1 and the extinguishing signal of the second light emission control signal EM2 before the data write stage t21, for example, the total period of the initialization stage t1 is a period difference between a starting point of a first high-level pulse of the first light emission control signal EM1 and a starting point of a first high-level pulse of the second light emission control signal EM2. According to the technical solution of this embodiment, the period of the initialization stage t1 may not be limited by the refresh rate, and when the refresh rate is relatively high, it can still ensure a relatively long total time of the initialization stage t1, thereby ensuring a sufficient reset of the control terminal of the drive module 110. Moreover, since the third initialization unit 133 is electrically connected to the first terminal of the light emission module 150, the first terminal of the light emission module 150 can be reset at the initialization stage t1 so that a period for initializing the first terminal of the light emission module 150 is also not limited by the refresh rate, which is conducive to improving short-term afterimage. The first terminal of the light emission module 150 is an anode of the light-emitting device D1.

At the data write stage t21, the scan signal input terminal Scan(i) inputs a logic low-level signal, and the third transistor T3 is turned on. The second light emission control signal EM2 is at a logic high level, the first initialization unit 131 (the fourth transistor T4) is turned on, the data voltage is written to the gate of the drive transistor DT through the third transistor T3, the drive transistor DT and the fourth transistor T4 which are turned on, the fourth transistor T4 writes the signal containing the threshold voltage information of the drive transistor DT to the gate of the drive transistor DT at the data write stage t21, and when a gate potential of the drive transistor DT reaches $V_{data}+V_{th}$, cutoff of the drive transistor DT compensates a threshold voltage of the drive transistor DT, thereby avoiding non-uniform display caused by a non-uniform threshold voltage of the drive transistor DT. Therefore, in the pixel circuit shown in FIG. 6, the fourth transistor T4 also serves as the threshold compensation transistor of the pixel circuit, or the threshold compensation transistor also serves as the first initialization unit 131.

At the light emission stage t3, both the second light emission control signal EM2 and the first light emission control signal EM1 are at logic low level, both the first transistor T1 and the second transistor T2 are turned on, the entire driving branch is turned on, and the drive transistor DT drives the light emission module 150 to emit light.

For example, the first initialization unit 131 and the first light emission control unit 141 include transistors of different channel types, and the third initialization unit 133 and the first light emission control unit 141 include transistors of different channel types.

Since at the initialization stage t1, the fourth transistor T4 and the sixth transistor T6 are turned on and the second transistor T2 is turned on, at the initialization stage t1, it is necessary to control the first transistor T1 to turn off so that the driving branch 10 cannot be turned on and emit light by mistake. Since the control terminal of the first initialization unit 131, the control terminal of the third initialization unit 133 and the control terminal of the first light emission control unit 141 access the same signal, the first initialization unit 131 and the first light emission control unit 141 are configured to include transistors of different channel types, which can ensure that the on-off state of the first initialization unit 131 is opposite to the on-off state of the first light emission control unit 141; the on-off state of the third initialization unit 133 is opposite to the on-off state of the first light emission control unit 141. Moreover, an original control signal of the pixel circuit can be used for controlling each initialization unit in the initialization module 130 so that the number of ports of the pixel circuit is relatively small.

Figure 7:
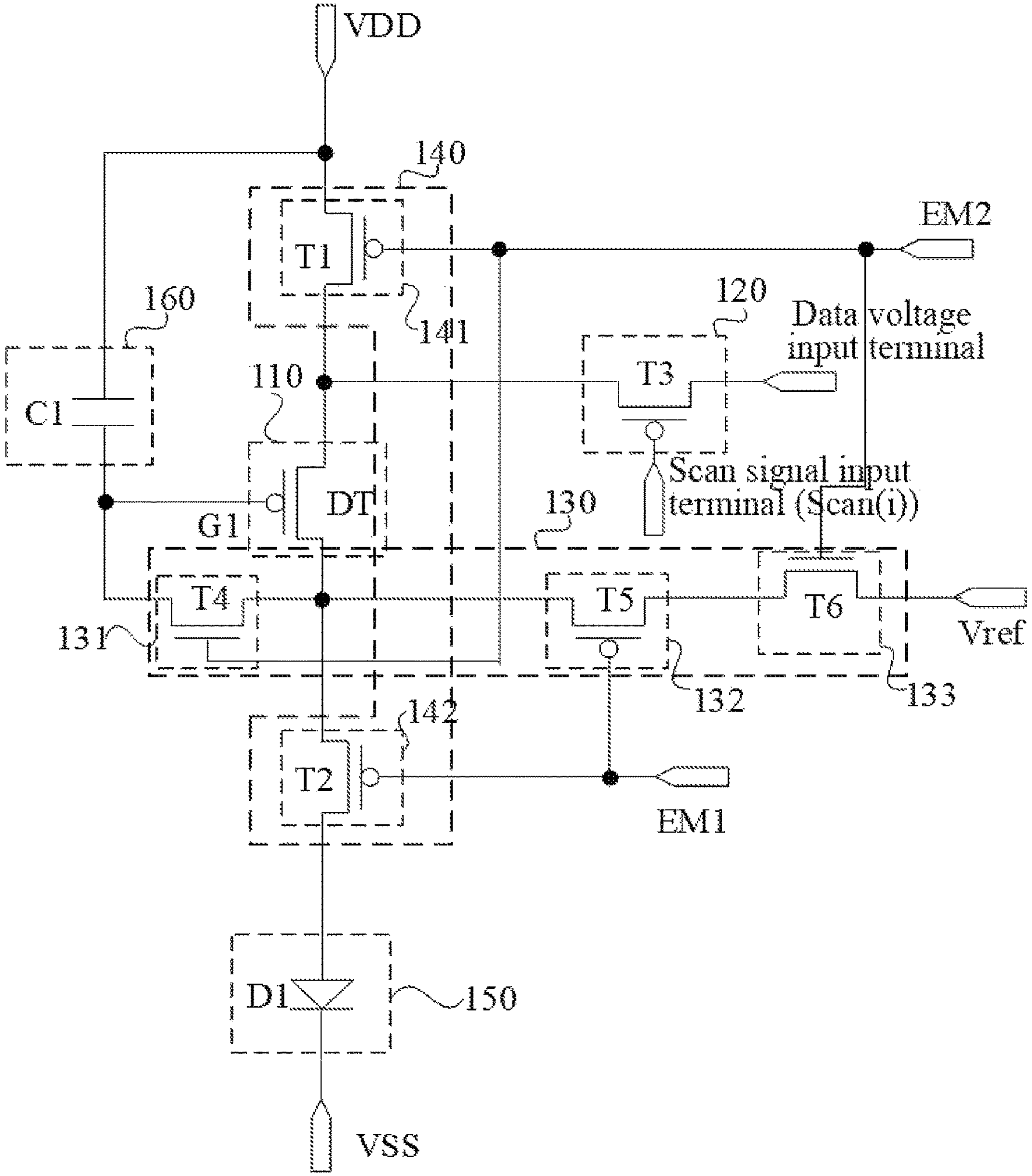
FIG. 7 is a structural diagram of another pixel circuit according to an embodiment of the present application.

FIG. 7 is a structural diagram of another pixel circuit according to an embodiment of the present application. Referring to FIG. 7, the control terminal of the first light emission control unit 141 accesses the second light emission control signal EM2, and the control terminal of the second light emission control unit 142 accesses the first light emission control signal EM1. The first terminal of the data write module 120 is electrically connected to the data voltage input terminal Data, the second terminal of the data write module 120 is electrically connected to the first terminal of the drive module 110, and the control terminal of the data write module 120 is electrically connected to the scan signal input terminal Scan(i); the drive module 110 includes a drive transistor DT.

The first initialization unit 131 is connected between the second terminal of the drive module 110 and the control terminal of the drive module 110, the control terminal of the first initialization unit 131 accesses the second light emission control signal EM2, and the first initialization unit 131 is configured to be turned on at the data write stage t21 under the control of the second light emission control signal EM2 and write a signal containing threshold voltage information of the drive transistor DT to the gate of the drive transistor DT.

A first terminal of the second initialization unit 132 is electrically connected to the initialization voltage terminal Vref, a second terminal of the second initialization unit 132 is electrically connected to the second terminal of the drive module 110, and the control terminal of the second initialization unit 132 accesses the first light emission control signal EM1.

The initialization module 130 further includes a third initialization unit 133, where a control terminal of the third initialization unit 133 accesses the second light emission control signal EM2, and the third initialization unit 133 is connected between the initialization voltage terminal Vref and the second initialization unit 132 or between the second initialization unit 132 and the first terminal of the light emission module 150. FIG. 5 exemplarily shows a structure of a pixel circuit in the case where the third initialization unit 133 connected between the initialization voltage terminal Vref and the second initialization unit 132.

Referring to FIG. 7, the data write module 120 includes a third transistor T3, the first initialization unit 131 includes a fourth transistor T4, the second initialization unit 132 includes a fifth transistor T5, and the third initialization unit 133 includes a sixth transistor T6.

The driving timing shown in FIG. 5 is also applicable to the pixel circuit shown in FIG. 7. Each transistor in FIG. 7 may be a p-type transistor or an n-type transistor, the channel type of the fourth transistor T4 is opposite to that of the first transistor T1, and the channel type of the sixth transistor T6 is opposite to that of the first transistor T1. That the fourth transistor T4 and the sixth transistor T6 are n-type transistors and the other transistors are p-type transistors is used as an example for a description, for the first light emission control signal EM1 and the second light emission control signal EM2, the light emission signal is a logic low-level signal, and the extinguishing signal is a logic high-level signal. For example, the fourth transistor T4 included in the first initialization unit 131 and the sixth transistor T6 included in the third initialization unit 133 are oxide transistors, for example, indium gallium zinc oxide transistors, thereby reducing leakage current. Referring to FIGS. 5 and 6, a working process of the pixel circuit includes an initialization stage t1, a data write stage t21 and a light emission stage t3.

At the initialization stage t1, the second light emission control signal EM2 is at a logic high level, the first initialization unit 131 (the fourth transistor T4) and the third initialization unit 133 (the sixth transistor T6) are turned on, and the first transistor T1 is turned off; the first light emission control signal EM1 is at a logic low level, and the second initialization unit 132 (the fifth transistor T5) is turned on. Therefore, the initialization module 130 is turned on, and the initialization voltage is written to the gate of the drive transistor DT through the initialization module 130 (the third initialization unit 133, the second initialization unit 132 and the first initialization unit 131). Moreover, a total time of the initialization stage t1 is an overlapping period of the light emission signal of the first light emission control signal EM1 and the extinguishing signal of the second light emission control signal EM2 before the data write stage t21, and the period of the initialization stage t1 may not be limited by the refresh rate. When the refresh rate is relatively high, it can still ensure a relatively long total period of the initialization stage t1, thereby ensuring a sufficient reset of the control terminal of the drive module 110. Moreover, at the initialization stage t1, the second transistor T2 is turned on in response to the logic low level of the first light emission control signal EM1 so that the initialization voltage can be written to the first terminal of the light emission module 150 through the sixth transistor T6, the fifth transistor T5 and the second transistor T2. Further, the first terminal of the light emission module 150 can be reset at the initialization stage t1 so that the period for initializing the first terminal of the light emission module 150 is also not limited by the refresh rate, which is conducive to improving the short-term afterimage.

At the data write stage t21, the scan signal input terminal Scan(i) inputs a logic low-level signal, and the third transistor T3 is turned on; the second light emission control signal EM2 is at a logic high level, the first initialization unit 131 (the fourth transistor T4) is turned on, the data voltage is written to the gate of the drive transistor DT through the third transistor T3, the drive transistor DT and the fourth transistor T4 which are turned on, the fourth transistor T4 writes the signal including the threshold voltage information of the drive transistor DT to the gate of the drive transistor DT. At the data write stage t21, when a gate potential of the drive transistor DT reaches $V_{data}+V_{th}$, the drive transistor DT is cut off, which achieves the compensation fora threshold voltage of the drive transistor DT, thereby avoiding non-uniform display caused by a non-uniform threshold voltage of the drive transistor DT. Therefore, in the pixel circuit shown in FIG. 7, the fourth transistor T4 also serves as the threshold compensation transistor of the pixel circuit, or the threshold compensation transistor also serves as the first initialization unit 131.

At the light emission stage t3, both the second light emission control signal EM2 and the first light emission control signal EM1 are at logic low level, both the first transistor T1 and the second transistor T2 are turned on, the entire driving branch is turned on, and the drive transistor DT drives the light emission module 150 to emit light.

The first initialization unit 131 and the first light emission control unit 141 include transistors of different channel types so that the on-off state of the first initialization unit 131 is opposite to the on-off state of the first light emission control unit 141, achieving that when the first light emission control unit 141 is turned off, the first initialization unit 131 is turned on. The third initialization unit 133 and the first light emission control unit 141 include transistors of different channel types so that the on-off state of the third initialization unit 133 is opposite to the on-off state of the first light emission control unit 141, achieving that when the first light emission control unit 141 is turned off, the third initialization unit 133 is turned on. The second initialization unit 132 and the second light emission control unit 142 include transistors of the same channel type so that the second initialization unit 132 and the second light emission control unit 142 have the same on-state. Moreover, an original control signal of the pixel circuit can be used for controlling each initialization unit in the initialization module 130 so that the number of ports of the pixel circuit is relatively small.

Figure 8:
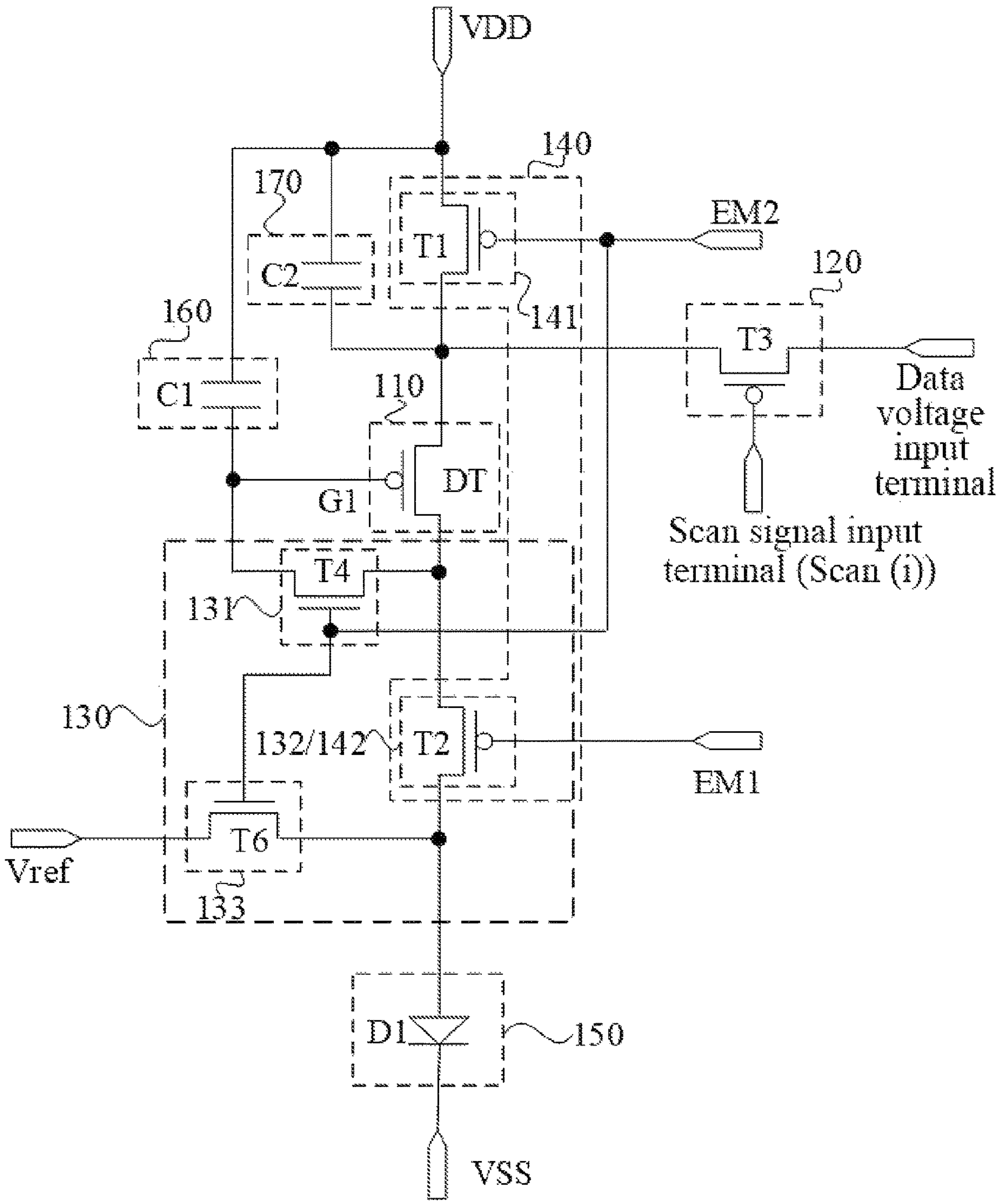
FIG. 8 is a structural diagram of another pixel circuit according to an embodiment of the present application.
Figure 9:
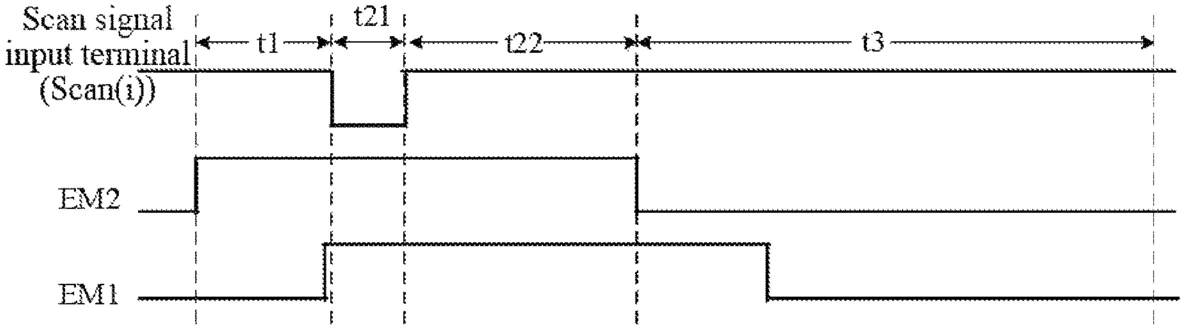
FIG. 9 is a driving timing graph of another pixel circuit according to an embodiment of the present application.

FIG. 8 is a structural diagram of another pixel circuit according to an embodiment of the present application, and FIG. 9 is a driving timing graph of another pixel circuit according to an embodiment of the present application. Referring to FIGS. 8 and 9, the pixel circuit further includes a second storage module 170. The second storage module 170 is configured to maintain a potential of the first terminal of the drive module 110 at a subthreshold swing compensation stage t22, and the first initialization unit 131 is configured to be turned on at the subthreshold swing compensation stage t22 under the control of the second light emission control signal EM2, where the subthreshold swing compensation stage t22 is between the data write stage t21 and the light emission stage t3. Compared with the pixel circuit shown in FIG. 6, referring to FIGS. 8 and 9, an operating process of the pixel circuit shown in FIG. 8 includes an initialization stage t1, a data write stage t21, a subthreshold swing compensation stage t22 and a light emission stage t3. At the initialization stage t1, the second light emission control signal EM2 is at a logic high level, the first initialization unit 131 (the fourth transistor T4) and the third initialization unit 133 (the sixth transistor T6) are turned on, and the first transistor T1 is turned off; the first light emission control signal EM1 is at a logic low level, and the second initialization unit 132 (the second transistor T2) is turned on. Therefore, the initialization module 130 is turned on, and the initialization voltage is written to the gate of the drive transistor DT through the initialization module 130 (the third initialization unit 133, the second initialization unit 132 and the first initialization unit 131). Moreover, a total period of the initialization stage t1 is an overlapping period of the light emission signal of the first light emission control signal EM1 and the extinguishing signal of the second light emission control signal EM2 before the data write stage t21. According to the technical solution of this embodiment, the period of the initialization stage t1 may not be limited by the refresh rate, and when the refresh rate is relatively high, it can still ensure a relatively long total period of the initialization stage t1, thereby ensuring a sufficient reset of the control terminal of the drive module 110. Moreover, since the third initialization unit 133 is electrically connected to the first terminal of the light emission module 150, the first terminal of the light emission module 150 can be reset at the initialization stage t1 so that a period for initializing the first terminal of the light emission module 150 is also not limited by the refresh rate, which is conducive to improving short-term afterimage. The first terminal of the light emission module 150 is an anode of the light-emitting device D1.

At the data write stage t21, the scan signal input terminal Scan(i) inputs a logic low-level signal, and the third transistor T3 is turned on; the second light emission control signal EM2 is at a logic high level, the first initialization unit 131 (the fourth transistor T4) is turned on, the data voltage is written to the gate of the drive transistor DT through the third transistor T3, the drive transistor DT and the fourth transistor T4 which are turned on, the fourth transistor T4 writes the signal including the threshold voltage information of the drive transistor DT to the gate of the drive transistor DT at the data write stage t21, and when a gate potential of the drive transistor DT reaches $V_{data}+V_{th}$, the drive transistor DT is cut off, which achieves the compensation for a threshold voltage of the drive transistor DT, thereby avoiding non-uniform display caused by a non-uniform threshold voltage of the drive transistor DT. Therefore, in the pixel circuit shown in FIG. 6, the fourth transistor T4 also serves as the threshold compensation transistor of the pixel circuit, or the threshold compensation transistor also serves as the first initialization unit 131.

At the subthreshold swing compensation stage t22, the first initialization unit 131 is turned on under the control of the second light emission control signal EM2 so that a leakage current of the drive transistor DT continues to charge the gate of the drive transistor DT.

At the light emission stage t3, both the second light emission control signal EM2 and the first light emission control signal EM1 are at logic low level, both the first transistor T1 and the second transistor T2 are turned on, the entire driving branch is turned on, and the drive transistor DT drives the light emission module 150 to emit light.

Subthreshold swing, also known as S factor, is numerically equal to an increase in gate voltage required to vary a drive current between a source and a drain of the drive transistor DT by one order of magnitude. A magnitude of the subthreshold swing affects a magnitude of the drive current generated by the drive transistor DT. For two drive transistors DT with different subthreshold swings, when gate-source voltage differences are the same, magnitudes of drive currents generated by the drive transistors DT are different. When the gate-source voltage differences are the same, the greater the subthreshold swing, the greater the drive current generated by the drive transistor at the medium/low grayscale, where the medium/low grayscale may correspond to a grayscale range where the drive current generated by the drive transistor is less than a set current threshold. Therefore, inconsistent subthreshold swings also affect the uniform display of the display panel. For the pixel circuit of this embodiment, the pixel circuit is configured to further include the second storage module 170. The second storage module 170 maintains the potential of the first terminal of the drive module 110 (the first electrode of the drive transistor DT) at the subthreshold swing compensation stage t22. Since the subthreshold swing compensation stage t22 is after the data write stage t21 and the data write module 120 is electrically connected to the first electrode of the drive transistor DT, the second storage module 170 holds a data voltage of the first electrode of the drive transistor DT at the subthreshold swing compensation stage t22. The first initialization unit 131 is turned on at the subthreshold swing compensation stage t22 under the control of the second light emission control signal EM2 so that the leakage current of the drive transistor DT continues to charge the gate of the drive transistor DT, and at the subthreshold swing compensation stage t22, a variation in the gate potential of the drive transistor DT is denoted as ΔV. Since the gate potential of the drive transistor DT is $V_{data}+V_{th}$ after the data write stage t21 is completed, the gate potential of the drive transistor DT is $V_{data}+V_{th}+\Delta V$ after the subthreshold swing compensation stage t22. Since at the medium/low grayscale, the greater the subthreshold swing of the drive transistor DT and the greater the leakage current of the drive transistor DT, the greater the variation ΔV in the gate potential of the drive transistor DT at the subthreshold swing compensation stage t22. According to the calculation formula of the drive current of the drive transistor DT:

$$\begin{aligned} I &= \frac{1}{2}\mu C_{ox}\frac{W}{L}(V_{gs}-V_{th})^2 \\ &= \frac{1}{2}\mu C_{ox}\frac{W}{L}(V_{data}+V_{th}+\Delta V-Vdd-Vth)^2 \\ &= \frac{1}{2}\mu C_{ox}\frac{W}{L}(V_{data}+\Delta V-Vdd)^2; \end{aligned}$$

where μ denotes carrier mobility, $C_{ox}$ is a capacitance of a gate oxide layer (a capacitance per unit area of a gate oxide), W/L denotes a width-to-length ratio of the drive transistor DT, $V_{gs}$ denotes a voltage difference between the gate of the drive transistor DT and the first electrode of the drive transistor DT, $V_{th}$ denotes the threshold voltage of the drive transistor DT, $V_{data}$ denotes the data voltage, and Vdd denotes a first power supply voltage input from the first power supply voltage input terminal VDD.

Using that the drive transistor DT is a p-type transistor as an example, both the data voltage Vdata and the first power supply voltage are positive voltages, the data voltage Vdata is less than the first power supply voltage Vdd, and therefore $V_{data}-Vdd<0$. Since the data voltage Vdata is a positive voltage, at the subthreshold swing compensation stage, the gate voltage of the drive transistor DT is gradually increased, that is, ΔV>0. According to the above calculation formula of the drive current, when the data voltage is constant, the greater the variation ΔV in the gate potential, the smaller the absolute value of $|V_{data}-Vdd+\Delta V|$, and the smaller the drive current. Therefore, through an compensation for the subthreshold swing at the subthreshold swing compensation stage t22, at the medium/low grayscale and the same data voltage, the greater the subthreshold swing of the drive transistor DT, the greater the current generated by the drive transistor DT is reduced so that at the medium/low grayscale and the same data voltage, drive currents of drive transistors DT with different subthreshold swings tend to be consistent, thereby reducing the non-uniform display of the display panel caused by the different subthreshold swings of the drive transistors DT at the medium/low grayscale. When the drive transistor is an n-type transistor, a working principle is similar to that of the p-type drive transistor described above, which is not repeated here.

Still referring to FIG. 8, a first terminal of the second storage module 170 is electrically connected to the first terminal of the drive module 110, and a second terminal of the second storage module 170 is electrically connected to the first power supply voltage input terminal VDD.

The second storage module 170 includes a second capacitor. The voltage input from the first power supply voltage input terminal VDD is constant, and both ends of the second storage module 170 are connected to the first terminal of the drive module 110 and the first power supply voltage input terminal VDD, respectively. Since a potential of the second terminal of the second storage module 170 is constant and the second storage module 170 has a function of storage and holding, a potential of the first terminal of the second storage module 170 may also be held at the data voltage input at the data write stage t21. Due to the leakage current of the drive transistor DT and the turned-on fourth transistor T4, at the subthreshold swing compensation stage t22, the gate of the drive transistor DT continues to be charged so that the subthreshold swing is compensated. For a specific principle of the compensation, reference may be made to the preceding embodiment, which is not repeated here.

Figure 10:
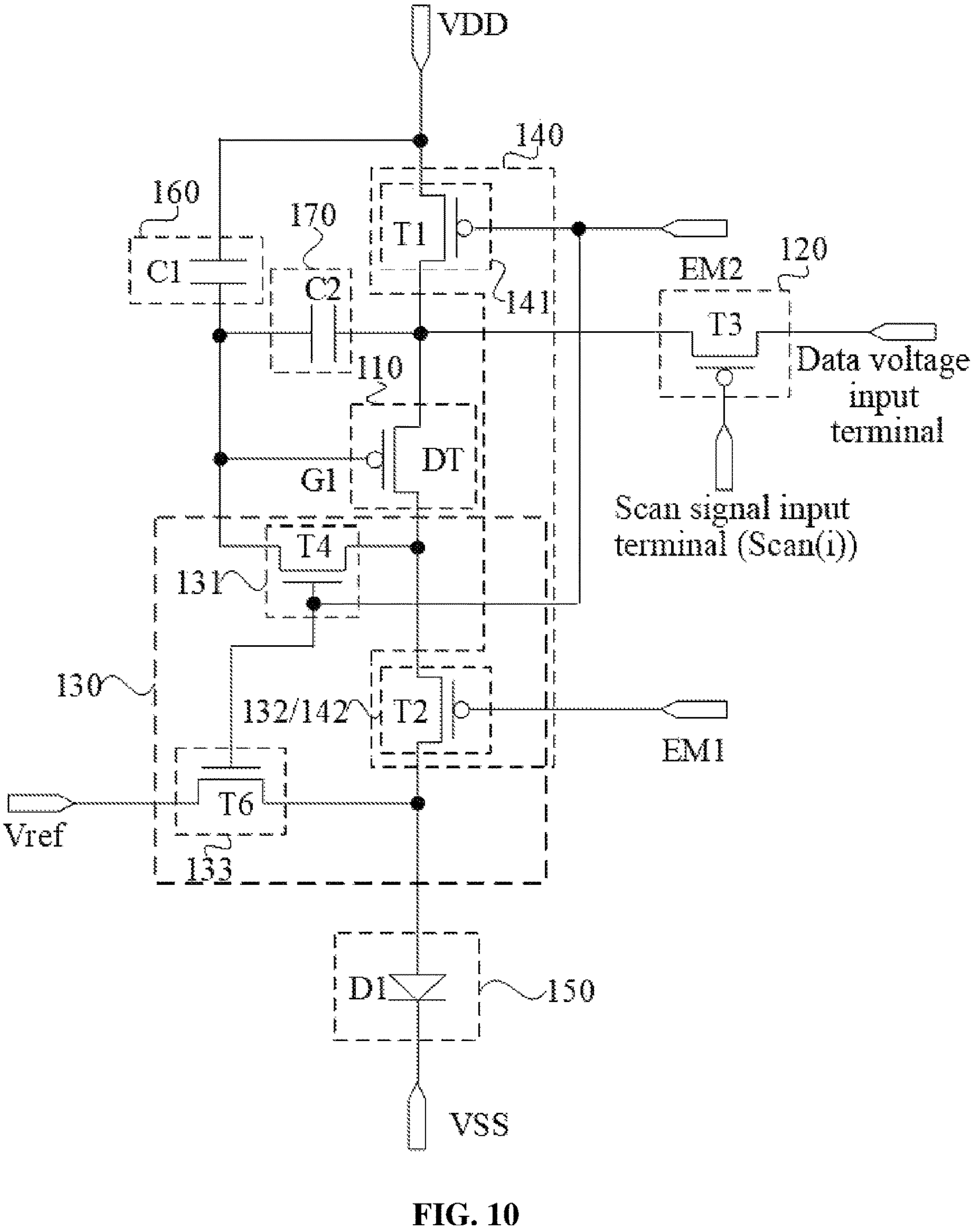
FIG. 10 is a structural diagram of another pixel circuit according to an embodiment of the present application.

FIG. 10 is structural diagram of another pixel circuit according to an embodiment of the present application, and the drive timing shown in FIG. 9 is also applicable to driving the pixel circuit shown in FIG. 10. Referring to FIGS. 9 and 10, in another embodiment of the present application, the first terminal of the second storage module 170 is electrically connected to the first terminal of the drive module 110, and the second terminal of the second storage module 170 is electrically connected to the control terminal G1 of the drive module 110.

Referring to FIGS. 9 and 10, an operating process of the pixel circuit shown in FIG. 9 includes an initialization stage t1, a data write stage t21, a subthreshold swing compensation stage t22 and a light emission stage t3.

At the initialization stage t1, the second light emission control signal EM2 is at a logic high level, the first initialization unit 131 (the fourth transistor T4) and the third initialization unit 133 (the sixth transistor T6) are turned on, and the first transistor T1 is turned off; the first light emission control signal EM1 is at a logic low level, and the second initialization unit 132 (the second transistor T2) is turned on. Therefore, the initialization module 130 is turned on, and the initialization voltage is written to the gate of the drive transistor DT through the initialization module 130 (the third initialization unit 133, the second initialization unit 132 and the first initialization unit 131). Moreover, a total time of the initialization stage t1 is an overlapping period of the light emission signal of the first light emission control signal EM1 and the extinguishing signal of the second light emission control signal EM2 before the data write stage t21. According to the technical solution of this embodiment, the period of the initialization stage t1 may not be limited by the refresh rate, and when the refresh rate is relatively high, it can still ensure a relatively long total time of the initialization stage t1, thereby ensuring a sufficient reset of the control terminal of the drive module 110. Moreover, since the third initialization unit 133 is electrically connected to the first terminal of the light emission module 150, the first terminal of the light emission module 150 can be reset at the initialization stage t1 so that a period for initializing the first terminal of the light emission module 150 is also not limited by the refresh rate, which is conducive to improving short-term afterimage. The first terminal of the light emission module 150 is an anode of the light-emitting device D1.

At the data write stage t21, the scan signal input terminal Scan(i) inputs a logic low-level signal, and the third transistor T3 is turned on; the second light emission control signal EM2 is at a logic high level, the first initialization unit 131 (the fourth transistor T4) is turned on, the data voltage is written to the gate of the drive transistor DT through the third transistor T3, the drive transistor DT and the fourth transistor T4 which are turned on, the fourth transistor T4 writes the signal including the threshold voltage information of the drive transistor DT to the gate of the drive transistor DT at the data write stage t21, and when a gate potential of the drive transistor DT reaches $V_{data}+V_{th}$, the drive transistor DT is cut off, which achieves the compensation for a threshold voltage of the drive transistor DT, thereby avoiding non-uniform display caused by a non-uniform threshold voltage of the drive transistor DT. Therefore, in the pixel circuit shown in FIG. 6, the fourth transistor T4 also serves as the threshold compensation transistor of the pixel circuit, or the threshold compensation transistor also serves as the first initialization unit 131.

At the subthreshold swing compensation stage t22, the first initialization unit 131 is turned on under the control of the second light emission control signal EM2 so that a leakage current of the drive transistor DT continues to charge the gate of the drive transistor DT.

At the light emission stage t3, both the second light emission control signal EM2 and the first light emission control signal EM1 are at logic low level, both the first transistor T1 and the second transistor T2 are turned on, the entire driving branch is turned on, and the drive transistor DT drives the light emission module 150 to emit light.

The second storage module 170 includes a second capacitor C2. The second storage module 170 can also store and hold the potential of the first terminal of the drive module 110 at the subthreshold swing compensation stage t22. Due to the leakage current of the drive transistor DT and the turned-on fourth transistor T4, at the subthreshold swing compensation stage t22, the gate of the drive transistor DT continues to be charged so that the subthreshold swing is compensated. For a specific principle of the compensation, reference may be made to the preceding embodiment, which is not repeated here. Moreover, since the first transistor T1 is turned on under the control of the second light emission control signal EM2 at the light emission stage, the first terminal of the second storage module 170 (the second capacitor C2) is pulled up to the voltage input from the first power supply voltage input terminal VDD, and accordingly, the potential of the gate G1 of the drive transistor DT is pulled up through coupling of the second capacitor C2. Since a gate of the fourth transistor T4 also accesses the second light emission control signal EM2 and the fourth transistor T4 has a parasitic capacitance, the gate potential of the drive transistor DT is pulled down through coupling of falling of the second light emission control signal EM2 at the light emission stage so that the pull-up and pull-down of the gate potential of the drive transistor DT are canceled each other out at the light emission stage and the potential of the second terminal of the second storage module 170 can finally be held at the data voltage, thereby ensuring that a magnitude of a drive current generated by the drive transistor DT is more accurate.

In conjunction with FIGS. 8-9 and 9-10, an extinguishing signal of the first light emission control signal EM1 for the second light emission control unit 142 and an extinguishing signal of the second light emission control signal EM2 for the first light emission control unit 141 overlap at the subthreshold swing compensation stage t22.

The extinguishing signal of the first light emission control signal EM1 for the second light emission control unit 142 is a pulse when the second light emission control unit 142 is turned off, and the extinguishing signal of the second light emission control signal EM2 for the first light emission control unit 141 is a pulse when the first light emission control unit 141 is turned off. The extinguishing signal of the first light emission control signal EM1 for the second light emission control unit 142 and the extinguishing signal of the second light emission control signal EM2 for the first light emission control unit 141 overlap at the subthreshold swing compensation stage t22 so that both the first light emission control unit 141 and the second light emission control unit 142 are turned off at the subthreshold swing compensation stage t22, thereby ensuring that the gate of the drive transistor DT can be continuously charged through the leakage current of the drive transistor DT and the first initialization unit 131 and achieving the compensation for the subthreshold swing of the drive transistor DT.

Figure 11:
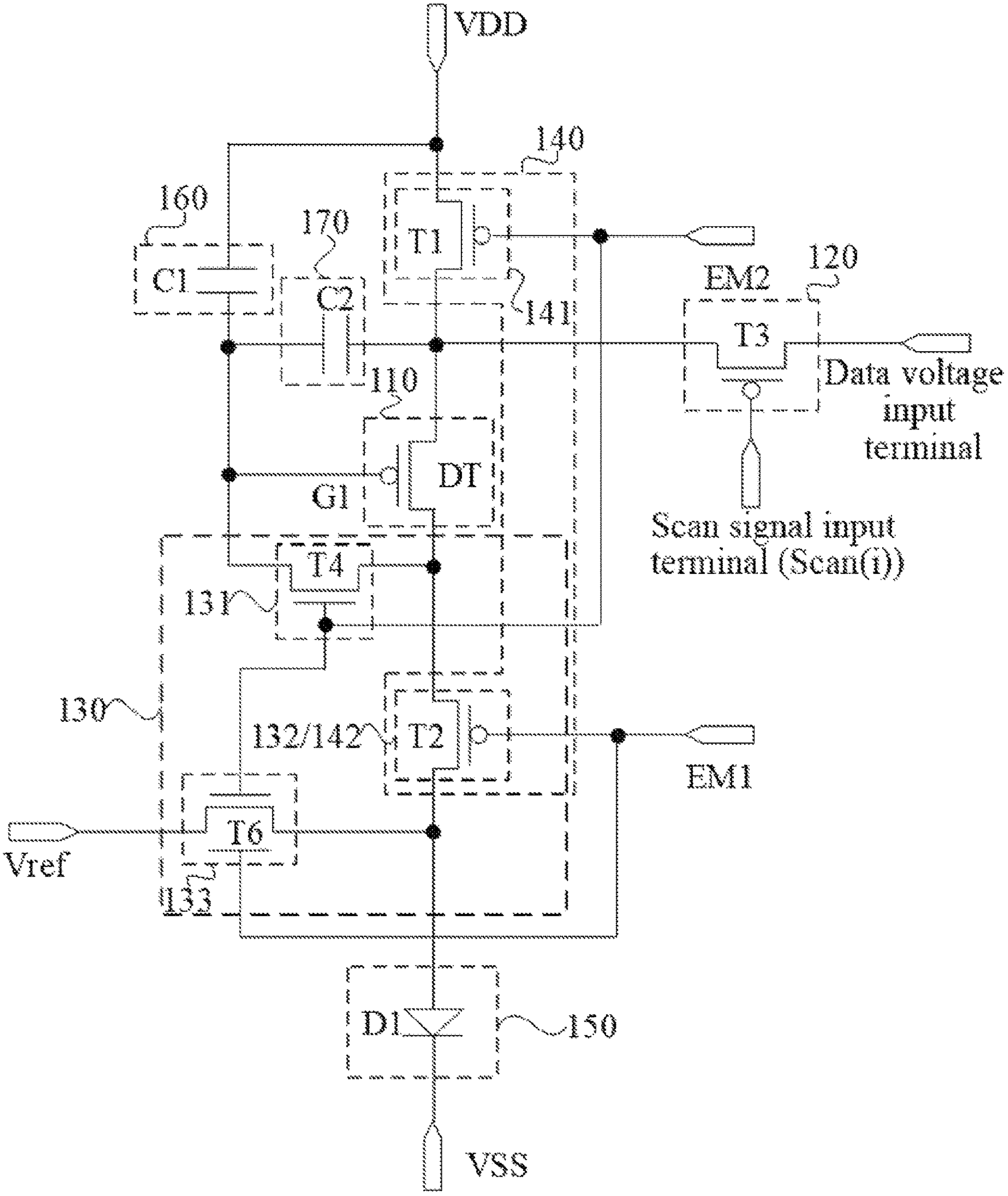
FIG. 11 is a structural diagram of another pixel circuit according to an embodiment of the present application.

FIG. 11 is a structural diagram of another pixel circuit according to an embodiment of the present application. In conjunction with FIGS. 3 and 11, the pixel circuit is applied to a display panel, and the display panel includes a first light emission control driving circuit 410 and a second light emission control driving circuit 420, where the first light emission control driving circuit 410 includes n stages of cascaded first shift registers 411, the second light emission control driving circuit 420 includes n stages of cascaded second shift registers 421, and the display panel further includes n rows of pixel circuits 100.

For a light emission control module 140 in any one of the pixel circuits, the light emission control module 140 is configured to be turned on at the light emission stage under a control of a first light emission control signal EM1 corresponding to an i-th row where a pixel circuit 100 to which the light emission control module 140 belongs is located and under a control of a second light emission control signal EM2 corresponding to the i-th row where the pixel circuit 100 to which the light emission control module 140 belongs is located so that the driving branch 10 is turned on.

The first light emission control signal EM1 corresponding to the i-th row where the pixel circuit is located is a light emission control signal output from a first shift register at an i-th stage in the first light emission control driving circuit 410, and the second light emission control signal EM2 corresponding to the i-th row where the pixel circuit is located is a light emission control signal output from a second shift register at an i-th stage in the second light emission control driving circuit 420, where a starting point of a first extinguishing signal of the first light emission control signal EM1 within one frame is earlier than a starting point of an extinguishing signal of the second light emission control signal EM2, and the period of the initialization stage within one frame is equal to a period difference between the starting point of the first extinguishing signal of the first light emission control signal EM1 and the starting point of the extinguishing signal of the second light emission control signal EM2.

The third initialization unit 133 includes a double-gate transistor, where a first gate of the double-gate transistor serves as the control terminal of the third initialization unit 133, a second gate of the double-gate transistor serves as an additional control terminal of the third initialization unit, and the additional control terminal accesses the first light emission control signal EM1.

Within one frame, the first light emission control signal EM1 includes a plurality of extinguishing signals, and the second light emission control signal EM2 includes one extinguishing signal.

The pixel circuit of this embodiment is applied to the display panel including the first light emission control driving circuit 410 and the second light emission control driving circuit 420, where the first light emission control driving circuit 410 provides the first light emission control signal EM1 for each pixel circuit, and the second light emission control driving circuit 420 provides the second light emission control signal EM2 for the each pixel circuit. In this case, within one frame, the number of extinguishing signals of the first light emission control signal EM1 may not be equal to the number of extinguishing signals of the second light emission control signal EM2, and correspondingly, the numbers of light emission signals may also not be equal.

Figure 12:
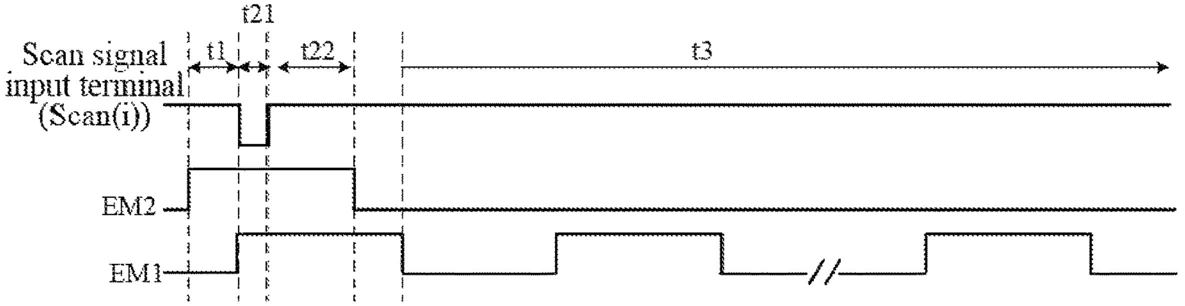
FIG. 12 is a driving timing graph of another pixel circuit according to an embodiment of the present application.

FIG. 12 is a driving timing graph of another pixel circuit according to an embodiment of the present application. Referring to FIG. 12, within one frame, the first light emission control signal EM1 includes a plurality of extinguishing signals, and the second light emission control signal EM2 includes one extinguishing signal. That both the first transistor T1 and the second transistor T2 are p-type transistors is still used as an example, in the first light emission control signal EM1 and the second light emission control signal EM2, the light emission signal is a logic low-level signal, and the extinguishing signal is a logic high-level signal. Referring to FIGS. 11 and 12, a working process of the pixel circuit may include an initialization stage t1, a data write stage t21, a subthreshold swing compensation stage t22 and a light emission stage t3.

At the initialization stage t1, the second light emission control signal EM2 is at a logic high level, the first initialization unit 131 (the fourth transistor T4) and the third initialization unit 133 (the sixth transistor T6) are turned on, and the first transistor T1 is turned off; the first light emission control signal EM1 is at a logic low level, and the second initialization unit 132 (the second transistor T2) is turned on. Therefore, the initialization module 130 is turned on, and the initialization voltage is written to the gate of the drive transistor DT through the initialization module 130 (the third initialization unit 133, the second initialization unit 132 and the first initialization unit 131). Moreover, the total period of the initialization stage t1 is the period of the initialization stage within one frame equal to the time difference between the starting point of the first extinguishing signal of the first light emission control signal EM1 and the starting point of the extinguishing signal of the second light emission control signal EM2. According to the technical solution of this embodiment, the period of the initialization stage t1 may not be limited by the refresh rate, and when the refresh rate is relatively high, it can still ensure a relatively long total time of the initialization stage t1, thereby ensuring a sufficient reset of the control terminal of the drive module 110. Moreover, since the third initialization unit 133 is electrically connected to the first terminal of the light emission module 150, the first terminal of the light emission module 150 can be reset at the initialization stage t1 so that a period for initializing the first terminal of the light emission module 150 is also not limited by the refresh rate, which is conducive to improving short-term afterimage. The first terminal of the light emission module 150 is an anode of the light-emitting device D1.

At the data write stage t21, the scan signal input terminal Scan(i) inputs a logic low-level signal, and the third transistor T3 is turned on; the second light emission control signal EM2 is at a logic high level, the first initialization unit 131 (the fourth transistor T4) is turned on, the data voltage is written to the gate of the drive transistor DT through the third transistor T3, the drive transistor DT and the fourth transistor T4 which are turned on, the fourth transistor T4 writes the signal including the threshold voltage information of the drive transistor DT to the gate of the drive transistor DT at the data write stage t21, and when a gate potential of the drive transistor DT reaches $V_{data}+V_{th}$, the drive transistor DT is cut off, which achieves the compensation for a threshold voltage of the drive transistor DT, thereby avoiding non-uniform display caused by a non-uniform threshold voltage of the drive transistor DT.

At the subthreshold swing compensation stage t22, the first initialization unit 131 is turned on under the control of the second light emission control signal EM2 so that a leakage current of the drive transistor DT continues to charge the gate of the drive transistor DT. It is to be noted that the pixel circuit may also not include the second storage module 170, and in this case, the operating process of the pixel circuit also does not include the subthreshold swing compensation stage t22. At the light emission stage t3, the second light emission control signal EM2 and the first light emission control signal EM1 are at logic low-level, both the first transistor T1 and the second transistor T2 are turned on, the entire driving branch is turned on, and the drive transistor DT drives the light emission module 150 to emit light. Different from other embodiments, in this embodiment, the transistor (the sixth transistor T6) included in the third initialization unit 133 is a double-gate transistor, a first gate of the double-gate transistor serves as the control terminal of the third initialization unit 133, a second gate of the double-gate transistor serves as an additional control terminal of the third initialization unit 133, the additional control terminal accesses the first light emission control signal EM1, and when a signal of any one of the ports in a control terminal and an additional control terminal of the sixth transistor T6 is an effective level signal, the sixth transistor T6 is turned on. The third initialization unit 133 is configured to include the additional control terminal, where the additional control terminal accesses the first light emission control signal EM1, and the first light emission control signal EM1 includes a plurality of extinguishing signals, where the plurality of extinguishing signals of the first light emission control signal EM1 are effective level signals of the third initialization unit 133 (the sixth transistor T6), and the first light emission control signal EM1 includes a plurality of extinguishing signals within one frame. Therefore, the third initialization unit 133 can be turned on a plurality of times within one frame, thereby achieving a black frame insertion a plurality of times at the light emission stage and improving a display effect at a low refresh rate. For the scan signal, within one frame, only one effective level pulse signal may be included, and the second light emission control signal EM2 may include only one extinguishing signal. The sixth transistor T6 included in the third initialization unit 133 is an oxide transistor. Since an active layer of the oxide transistor is extremely sensitive to light, a light-shielding layer corresponding to a channel of the sixth transistor T6 in the active layer is disposed on a side of the active layer closer to a substrate, that is, a side of the active layer farther from a light-emitting device layer. The light-shielding layer may have a metal structure and may be used as a second gate of the sixth transistor T6, that is, the additional control terminal of the third initialization unit 133.

Figure 13:
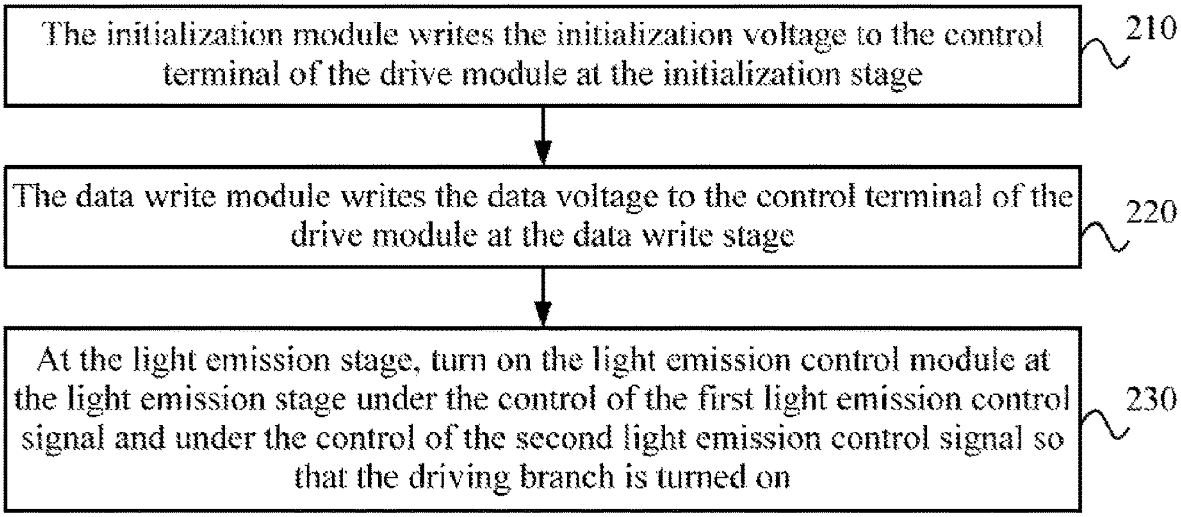
FIG. 13 is a flowchart of a method for driving a pixel circuit according to an embodiment of the present application.

The embodiments of the present application further provide a method for driving a pixel circuit. The driving method is applicable to driving the pixel circuit of any of the preceding embodiments of the present application. FIG. 13 is a flowchart of a method for driving a pixel circuit according to an embodiment of the present application. Referring to FIG. 13, the method for driving a pixel circuit includes the steps described below.

In step 210, the initialization module writes the initialization voltage to the control terminal of the drive module at the initialization stage.

In step 220, the data write module writes the data voltage to the control terminal of the drive module at the data write stage.

In step 230, at the light emission stage, the light emission control module is turned on at the light emission stage under the control of the first light emission control signal and under the control of the second light emission control signal so that the driving branch is turned on.

The first light emission control signal and the second light emission control signal each include a light emission signal and an extinguishing signal, where the light emission signal of the first light emission control signal and the light emission signal of the second light emission control signal overlap at the light emission stage, the extinguishing signal of the first light emission control signal and the extinguishing signal of the second light emission control signal overlap at the data write stage, the light emission signal of the first light emission control signal and the extinguishing signal of the second light emission control signal overlap at the initialization stage, and the period of the initialization stage is equal to the overlapping period of the light emission signal of the first light emission control signal and the extinguishing signal of the second light emission control signal before the data write stage.

In the method for driving a pixel circuit provided in this embodiment, the initialization voltage is written to the control terminal of the drive module at the initialization stage; the light emission control module, the drive module and the light emission module are connected in series to form the driving branch, and the light emission control module is configured to be turned on at the light emission stage under the control of the first light emission control signal and under the control of the second light emission control signal so that the driving branch is turned on, where the light emission signal of the first light emission control signal and the extinguishing signal of the second light emission control signal overlap at the initialization stage, and the period of the initialization stage within one frame is equal to the overlapping period of the light emission signal of the first light emission control signal and the extinguishing signal of the second light emission control signal before the data write stage. According to the technical solution of this embodiment, the period of the initialization stage may not be limited by the refresh rate, and when the refresh rate is relatively high, it can still ensure a relatively long total time of the initialization stage, thereby ensuring a sufficient reset of the control terminal of the drive module; and in the display panel including this embodiment, after the end of initialization stages of different pixel circuits, control terminals of drive modules can all be initialized to have the same voltage, which is conducive to improving the brightness uniformity of the display panel.

The embodiments of the present application further provide a display panel. For a structure of the display panel, reference may be made to FIG. 2. The display panel includes the pixel circuit 100 of any one of the preceding embodiments of the present application.

Still referring to FIG. 2, the display panel further includes a light emission control driving circuit 310, where the light emission control driving circuit 310 includes (n+j) stages of cascaded shift registers 311 and n rows of pixel circuits 100, where a pixel circuit 100 in an i-th row is electrically connected to a shift register at an (i+j)-th stage and a shift register at an i-th stage, separately, a light emission control signal output from the shift register at the (i+j)-th stage serves as a first light emission control signal of the pixel circuit in the i-th row, and a light emission control signal output from the shift register at the i-th stage serves as a second light emission control signal of the pixel circuit in the i-th row.

Still referring to FIG. 2, the display panel further includes a plurality of light emission control lines (E1, E2, E3, E4 . . . ). A shift register 311 at each stage is connected to one light emission control signal line. The light emission control driving circuit 310 may further include a start signal input terminal STY. The start signal input terminal STV is used for inputting a start signal, and the shift register at each stage of the light emission control driving circuit 310 is configured to shift and output a pulse signal of the start signal.

The embodiments of the present application further provide another display panel. For the display panel, reference may be made to FIG. 3. The display panel further includes a first light emission control driving circuit 410 and a second light emission control driving circuit 420, where the first light emission control driving circuit 410 includes n stages of cascaded first shift registers 411, and the second light emission control driving circuit 420 includes n stages of cascaded second shift registers 421, where a pixel circuit 100 in an i-th row is electrically connected to a first shift register 411 at an i-th stage and a second shift register 421 at an i-th stage, separately, a light emission control signal output from the first shift register 411 at the i-th stage serves as a first light emission control signal of the pixel circuit in the i-th row, and a light emission control signal output from the second shift register 421 at the i-th stage serves as a second light emission control signal of the pixel circuit in the i-th row.

Still referring to FIG. 3, the display panel further includes a plurality of first light emission control lines (E11, E12, E13, E14 . . . ) and a plurality of second light emission control signal lines (E21, E22, E23, E24 . . . ). A first shift register 411 at each stage is connected to one first light emission control signal line, and a second shift register 421 in each stage is connected to one second light emission control signal line. The first light emission control driving circuit 410 may further include a first start signal input terminal STV1. The first start signal input terminal STV1 is used for inputting a first start signal, and the first shift register 411 at each stage of the first light emission control driving circuit 410 is configured to shift and output a pulse signal of the first start signal. The second light emission control driving circuit 420 may further include a second start signal input terminal STV2. The second start signal input terminal STV2 is used for inputting a second start signal, and the second shift register 421 in each stage of the second light emission control driving circuit 420 is configured to shift and output a pulse signal of the second start signal.

The embodiments of the present application further provide a display device. The display device includes the display panel of any one of the preceding embodiments of the present application. The display device may be a mobile phone, or may be a computer, a television, a smart wearable display device or the like, which is not specifically limited in the embodiments of the present application.

It is to be noted that the above are only example embodiments of the present application and the technical principles used therein. It will be understood by those skilled in the art that the present application is not limited to the specific embodiments described herein. Those skilled in the art can make various apparent variations, adaptions, and substitutions without departing from the scope of the present application. Therefore, while the present application has been described in detail via the preceding embodiments, the present application is not limited to the preceding embodiments and may include more other equivalent embodiments without departing from the concept of the present application. The scope of the present application is determined by the scope of the appended claims.

What is claimed is:

1. A pixel circuit, comprising: a drive module, a data write module, an initialization module, a light emission control module and a light emission module;

wherein the initialization module is electrically connected to a control terminal of the drive module and configured to write an initialization voltage to the control terminal of the drive module at an initialization stage;

the data write module is electrically connected to the control terminal of the drive module and configured to write a data voltage to the control terminal of the drive module at a data write stage; and the light emission control module, the drive module and the light emission module are connected in series to form a driving branch, and the light emission control module is configured to be turned on at a light emission stage under a control of a first light emission control signal and under a control of a second light emission control signal so that the driving branch is turned on;

wherein each of the first light emission control signal and the second light emission control signal comprises a light emission signal and an extinguishing signal, wherein the light emission signal of the first light emission control signal and the light emission signal of the second light emission control signal overlap at the light emission stage, the extinguishing signal of the first light emission control signal and the extinguishing signal of the second light emission control signal overlap at the data write stage, the light emission signal of the first light emission control signal and the extinguishing signal of the second light emission control signal overlap at the initialization stage, and a period of the initialization stage within one frame is equal to an overlapping period of the light emission signal of the first light emission control signal and the extinguishing signal of the second light emission control signal before the data write stage.

2. The pixel circuit according to claim 1, further comprising: a first power supply voltage input terminal and a second power supply voltage input terminal;

wherein the light emission control module comprises a first light emission control unit and a second light emission control unit, the first light emission control unit is connected between the first power supply voltage input terminal and a first terminal of the drive module, the second light emission control unit is connected between a second terminal of the drive module and a first terminal of the light emission module;

wherein a control terminal of one of the first light emission control unit and the second light emission control unit accesses the second light emission control signal, a control terminal of the other one of the first light emission control unit and the second light emission control unit accesses the first light emission control signal, and the first terminal of the light emission module is electrically connected to the second power supply voltage input terminal.

3. The pixel circuit according to claim 2, further comprising: an initialization voltage terminal, wherein the initialization module comprises at least a first initialization unit and a second initialization unit connected in series to the initialization voltage terminal and the control terminal of the drive module, wherein the first initialization unit is configured to be turned on when a light emission control unit accessing the second light emission control signal is turned off, and the second initialization unit is configured to be turned on when a light emission control unit accessing the first light emission control signal is turned on.

4. The pixel circuit according to claim 3, further comprising a data voltage input terminal, wherein the control terminal of the first light emission control unit accesses the second light emission control signal, and the control terminal of the second light emission control unit accesses the first light emission control signal;

wherein a first terminal of the data write module is electrically connected to the data voltage input terminal, a second terminal of the data write module is electrically connected to the first terminal of the drive module, and a control terminal of the data write module is electrically connected to a scan signal input terminal;

wherein the drive module comprises a drive transistor, the first initialization unit is connected between the second terminal of the drive module and the control terminal of the drive module, a control terminal of the first initialization unit accesses the second light emission control signal, and the first initialization unit is configured to be turned on at the data write stage under the control of the second light emission control signal and write a signal comprising threshold voltage information of the drive transistor to a gate of the drive transistor;

wherein the second light emission control unit serves as the second initialization unit, and the initialization module further comprises a third initialization unit;

wherein a first terminal of the third initialization unit is electrically connected to the initialization voltage terminal, a second terminal of the third initialization unit is electrically connected to the first terminal of the light emission module, and a control terminal of the third initialization unit accesses the second light emission control signal.

5. The pixel circuit according to claim 4, further comprising a second storage module, wherein the second storage module is configured to maintain a first gate electrode potential of the drive transistor at a subthreshold swing compensation stage, and the first initialization unit is configured to be turned on at the subthreshold swing compensation stage under the control of the second light emission control signal;

wherein the subthreshold swing compensation stage is configured between the data write stage and the light emission stage.

6. The pixel circuit according to claim 5, wherein a first terminal of the second storage module is electrically connected to the first terminal of the drive module, and a second terminal of the second storage module is electrically connected to the first power supply voltage input terminal.

7. The pixel circuit according to claim 5, wherein a first terminal of the second storage module is electrically connected to the first terminal of the drive module, and a second terminal of the second storage module is electrically connected to the control terminal of the drive module.

8. The pixel circuit according to claim 5, wherein the extinguishing signal of the first light emission control signal and the extinguishing signal of the second light emission control signal overlap at the subthreshold swing compensation stage.

9. The pixel circuit according to claim 4, wherein the first initialization unit and the first light emission control unit comprise a plurality of transistors of different channel types, and the third initialization unit and the first light emission control unit comprise a plurality of transistors of different channel types.

10. The pixel circuit according to claim 3, further comprising a data voltage input terminal, wherein the control terminal of the first light emission control unit accesses the second light emission control signal, and the control terminal of the second light emission control unit accesses the first light emission control signal;

wherein a first terminal of the data write module is electrically connected to the data voltage input terminal, a second terminal of the data write module is electrically connected to the first terminal of the drive module, and a control terminal of the data write module is electrically connected to a scan signal input terminal;

wherein the drive module comprises a drive transistor, the first initialization unit is connected between the second terminal of the drive module and the control terminal of the drive module, a control terminal of the first initialization unit accesses the second light emission control signal, and the first initialization unit is configured to be turned on at the data write stage under the control of the second light emission control signal and write a signal comprising threshold voltage information of the drive transistor to a gate of the drive transistor;

wherein a first terminal of the second initialization unit is electrically connected to the initialization voltage terminal, a second terminal of the second initialization unit is electrically connected to the second terminal of the drive module, and a control terminal of the second initialization unit accesses the first light emission control signal; and wherein the initialization module further comprises a third initialization unit, a control terminal of the third initialization unit accesses the second light emission control signal, and the third initialization unit is connected between the initialization voltage terminal and the second initialization unit or between the second initialization unit and a first terminal of the light emission module.

11. The pixel circuit according to claim 10, wherein the first initialization unit and the first light emission control unit comprise a plurality of transistors of different channel types, the third initialization unit and the first light emission control unit comprise a plurality of transistors of different channel types, and the second initialization unit and the second light emission control unit comprise a plurality of transistors of a same channel type.

12. The pixel circuit according to claim 3, further comprising a data voltage input terminal, wherein the control terminal of the first light emission control unit accesses the first light emission control signal, and the control terminal of the second light emission control unit accesses the second light emission control signal; and a first terminal of the data write module is electrically connected to the data voltage input terminal, a second terminal of the data write module is electrically connected to the control terminal of the drive module, and a control terminal of the data write module is electrically connected to a scan signal input terminal.

13. The pixel circuit according to claim 3, wherein the first initialization unit comprises an oxide transistor.

14. The pixel circuit according to claim 2, further comprising: a first storage module, wherein a first terminal of the first storage module is electrically connected to the control terminal of the drive module, and a second terminal of the first storage module is electrically connected to the first power supply voltage input terminal.

15. The pixel circuit according to claim 1, wherein the extinguishing signal of the first light emission control signal and the extinguishing signal of the second light emission control signal have a same pulse width.

16. A display panel, comprising a pixel circuit, the pixel circuit comprises:

a drive module, a data write module, an initialization module, a light emission control module and a light emission module;

wherein the initialization module is electrically connected to a control terminal of the drive module and configured to write an initialization voltage to the control terminal of the drive module at an initialization stage;

the data write module is electrically connected to the control terminal of the drive module and configured to write a data voltage to the control terminal of the drive module at a data write stage; and the light emission control module, the drive module and the light emission module are connected in series to form a driving branch, and the light emission control module is configured to be turned on at a light emission stage under a control of a first light emission control signal and under a control of a second light emission control signal so that the driving branch is turned on;

wherein each of the first light emission control signal and the second light emission control signal comprises a light emission signal and an extinguishing signal, wherein the light emission signal of the first light emission control signal and the light emission signal of the second light emission control signal overlap at the light emission stage, the extinguishing signal of the first light emission control signal and the extinguishing signal of the second light emission control signal overlap at the data write stage, the light emission signal of the first light emission control signal and the extinguishing signal of the second light emission control signal overlap at the initialization stage, and a period of the initialization stage within one frame is equal to an overlapping period of the light emission signal of the first light emission control signal and the extinguishing signal of the second light emission control signal before the data write stage;

wherein the display panel comprises a first light emission control driving circuit and a second light emission control driving circuit, the first light emission control driving circuit comprises n stages of cascaded first shift registers, and the second light emission control driving circuit comprises n stages of cascaded second shift registers, wherein a pixel circuit in an i-th row is electrically connected to a first shift register at an i-th stage and a second shift register at an i-th stage, separately, a light emission control signal output from the first shift register at the i-th stage serves as a first light emission control signal of the pixel circuit in the i-th row, and a light emission control signal output from the second shift register at the i-th stage serves as a second light emission control signal of the pixel circuit in the i-th row.

17. The display panel according to claim 16, comprising: n rows of pixel circuits;

wherein for the light emission control module in any one of pixel circuits, the light emission control module is configured to be turned on at the light emission stage under a control of a first light emission control signal corresponding to an i-th row where a pixel circuit to which the light emission control module belongs is located and under a control of a second light emission control signal corresponding to the i-th row where the pixel circuit to which the light emission control module belongs is located so that the driving branch is turned on;

wherein the first light emission control signal corresponding to the i-th row where the pixel circuit is located is a light emission control signal output from a first shift register at an i-th stage in the first light emission control driving circuit, and the second light emission control signal corresponding to the i-th row where the pixel circuit is located is a light emission control signal output from a second shift register at an i-th stage in the second light emission control driving circuit;

wherein a starting point of a first extinguishing signal of the first light emission control signal within one frame is earlier than a starting point of an extinguishing signal of the second light emission control signal, and the period of the initialization stage within one frame is equal to a period difference between the starting point of the first extinguishing signal of the first light emission control signal and the starting point of the extinguishing signal of the second light emission control signal, and n and i are positive integers.

18. The display panel according to claim 16, further comprising: n rows of pixel circuits;

for a light emission control module in any one of pixel circuits, the light emission control module is configured to be turned on at the light emission stage under a control of a first light emission control signal corresponding to an i-th row where a pixel circuit to which the light emission control module belongs is located and under a control of a second light emission control signal corresponding to the i-th row where the pixel circuit to which the light emission control module belongs is located so that the driving branch is turned on;

wherein the first light emission control signal corresponding to the i-th row where the pixel circuit is located is a light emission control signal output from a shift register at an i-th stage in the first light emission control driving circuit, and the second light emission control signal corresponding to the i-th row where the pixel circuit is located is a light emission control signal output from a shift register at an i-th stage in the second light emission control driving circuit, wherein a starting point of a first extinguishing signal of the first light emission control signal within one frame is earlier than a starting point of an extinguishing signal of the second light emission control signal, and the period of the initialization stage within one frame is equal to a period difference between the starting point of the first extinguishing signal of the first light emission control signal and the starting point of the extinguishing signal of the second light emission control signal;

wherein the third initialization unit comprises a double-gate transistor, a first gate of the double-gate transistor serves as the control terminal of the third initialization unit, a second gate of the double-gate transistor serves as an additional control terminal of the third initialization unit, and the additional control terminal accesses the first light emission control signal; and within one frame, the first light emission control signal comprises a plurality of extinguishing signals, and the second light emission control signal comprises one extinguishing signal.

19. A display panel, comprising a pixel circuit, wherein the pixel circuit comprises: a drive module, a data write module, an initialization module, a light emission control module and a light emission module;

wherein the initialization module is electrically connected to a control terminal of the drive module and configured to write an initialization voltage to the control terminal of the drive module at an initialization stage;

the data write module is electrically connected to the control terminal of the drive module and configured to write a data voltage to the control terminal of the drive module at a data write stage; and the light emission control module, the drive module and the light emission module are connected in series to form a driving branch, and the light emission control module is configured to be turned on at a light emission stage under a control of a first light emission control signal and under a control of a second light emission control signal so that the driving branch is turned on;

wherein each of the first light emission control signal and the second light emission control signal comprises a light emission signal and an extinguishing signal, wherein the light emission signal of the first light emission control signal and the light emission signal of the second light emission control signal overlap at the light emission stage, the extinguishing signal of the first light emission control signal and the extinguishing signal of the second light emission control signal overlap at the data write stage, the light emission signal of the first light emission control signal and the extinguishing signal of the second light emission control signal overlap at the initialization stage, and a period of the initialization stage within one frame is equal to an overlapping period of the light emission signal of the first light emission control signal and the extinguishing signal of the second light emission control signal before the data write stage;

wherein the display panel further comprises a light emission control driving circuit, wherein the light emission control driving circuit comprises (n+j) stages of cascaded shift registers and n rows of pixel circuits, wherein a pixel circuit in an i-th row is electrically connected to a shift register at an (i+j)-th stage and a shift register at an i-th stage, separately, a light emission control signal output from the shift register at the (i+j)-th stage serves as a first light emission control signal of the pixel circuit in the i-th row, and a light emission control signal output from the shift register at the i-th stage serves as a second light emission control signal of the pixel circuit in the i-th row.

20. The display panel according to claim 19, wherein $n \geq 2$, $j \geq 1$, and n and j are positive integers; and for the light emission control module in any one of pixel circuits, the light emission control module is configured to be turned on at the light emission stage under a control of a light emission control signal at a current stage corresponding to a row where a pixel circuit to which the light emission control module belongs is located and under a control of a light emission control signal at a j-th stage preceding the light emission control signal at the current stage so that the driving branch is turned on;

wherein the light emission control signal at the current stage is a light emission control signal output from a shift register at an (i+j)-th stage corresponding to the pixel circuit which is located in an i-th row of the display panel, wherein the light emission control signal at the current stage serves as the first light emission control signal, the light emission control signal at the j-th stage preceding the light emission control signal at the current stage serve as the second light emission control signal, $i \geq 1$, and i is a positive integer;

wherein a period of the initialization stage is a difference between starting points of same level pulses of the light emission control signal at the current stage and the light emission control signal at the j-th stage preceding the light emission control signal at the current stage.

* * * * *